(12) United States Patent
Toledano et al.

(10) Patent No.: US 7,936,734 B2
(45) Date of Patent: May 3, 2011

(54) PORTABLE CELLULAR ENHANCER

(75) Inventors: Eyal Toledano, Kiryat Ata (IL); Natan Linder, Motza Illit (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 881 days.

(21) Appl. No.: 11/889,814

(22) Filed: Aug. 16, 2007

(65) Prior Publication Data

US 2009/0046677 A1  Feb. 19, 2009

(51) Int. Cl.
*H04W 4/00* (2009.01)
(52) U.S. Cl. ............. 370/338; 370/310.2; 370/328
(58) Field of Classification Search .......... None
See application file for complete search history.

(56) References Cited

U.S. PATENT DOCUMENTS

| 5,963,951 | A | 10/1999 | Collins |
| 6,363,427 | B1 | 3/2002 | Teibel et al. |
| 7,047,041 | B2 * | 5/2006 | Vanska et al. ............. 455/558 |
| 7,346,369 | B2 * | 3/2008 | Fitton et al. ............. 455/553.1 |
| 7,675,537 | B2 * | 3/2010 | Wilson et al. ........... 348/14.01 |
| 2003/0234804 | A1 * | 12/2003 | Parker et al. .............. 345/719 |
| 2004/0117322 | A1 * | 6/2004 | Bjorksten et al. ............. 705/80 |
| 2005/0220063 | A1 * | 10/2005 | Hong et al. .............. 370/338 |
| 2007/0066359 | A1 * | 3/2007 | Zhuang .................... 455/557 |
| 2008/0259043 | A1 * | 10/2008 | Buil et al. .................. 345/173 |
| 2009/0046677 | A1 * | 2/2009 | Toledano et al. ........... 370/338 |

\* cited by examiner

*Primary Examiner* — Robert W Wilson

(57) ABSTRACT

An apparatus for sharing user-defined media content with a peer. The apparatus comprises a repository for storing media content inputted by a user of the apparatus and a wireless interface for establishing a wireless personal area network (WPAN) with a first communication entity of the peer in a proximity to said apparatus. The WPAN allows the peer to access the media content using the first communication entity, thereby allows the user to share said media content with the peer.

57 Claims, 15 Drawing Sheets

PORTABLE CELLULAR ENHANCER

FIELD AND BACKGROUND OF THE INVENTION

The present invention relates to a method and an apparatus for supporting interactions between a user and peers and, more particularly, but not exclusively, to a method and an apparatus for supporting services and wireless interactions between a user and peers and enhancing the user experience.

In the modern world, many people use social communities on the Internet to interact with people and to meet friends and acquaintances for a variety of reasons such as romantic involvement, friendship, career advancement, commercial benefit, and non-profit and political benefit.

In some cases, interacting through social communities reduces the risks of rejection, deception, and even physical danger that exist when interacting with strangers. Such risks are especially acute when it comes to meeting people for dating. One way to meet people for dating is for one individual to approach another individual in a public forum, such as a bar, a park, etc. In an archetypical case, a man might approach a woman to strike up a conversation. Two problems immediately arise. First, the woman is likely to reject the man for any number of reasons such as an involvement in another relationship or physical or mental incompatibility. Second, without any additional information about the approaching man, the woman has little context for deciding if she should put effort into the match as does not know his background, occupation, etc. While the previous example describes a specific, if quite common, form of meeting people, many of the same risks also occur in other social interactions where the goal is not dating. When looking for a new friend, developing a business relationship or simply seeking an activity partner, people are adverse to the risks of rejection and incompatibility.

A social community, such as a dating community, allows an individual, such as a community member, to share personal information and pictures with other individuals. In such a manner, individuals can base their decision whether to approach the community member on personal information and pictures, thereby to avoid some of the undesired situations. In a typical on-line social community service, individuals register with the service and provide extensive background information about them.

For example, U.S. Pat. No. 5,963,951, issued on Oct. 5, 1999, discloses a computerized on-line dating service for searching and matching people. The on-line dating service comprises a database of subscriber information that includes preferences of subscribers to the service such as a gender preference, a geographic location preference, an age preference, appearance preferences, religious belief preferences, educational level preferences, and a relationship goal preference. The database is repeatedly searched for records matching the personal preferences of the user by at least a percentage match parameter value.

Another example for allowing communication between users is disclosed in U.S. Pat. No. 6,363,427, issued on Mar. 26, 2002 that describes a method of electronic message exchange. The method comprises reading other identifications of other personal data areas on other servers, reading from the other personal data areas other message identifications identifying other messages stored on the other personal data areas, and merging the other message identifications into a list of messages.

Though the aforementioned systems allow members to receive personal information about other members, the members cannot get the real sense of another's personality without speaking to or seeing him or her in person. Moreover, the social communities' services are usually based on rote screening of criteria, behind walls of anonymity. They do not provide any features for community, collaboration, or referral.

The aforementioned online social communities are usually detached from the daily life of the members. The online social communities do not support interacting with peers in public forums. Such interactions are more exciting and vivid as they occur in person. Though the aforementioned methods provide an alternative to the traditional interactions among peers, some may think that they are not exciting and vivid experience as the traditional interactions that allow people to get to know one another in person. Moreover, the aforementioned services do not assist the members in forming relationships with people who are members or people they meet in the middle of the day.

There is thus a widely recognized need for, and it would be highly advantageous to have, a system and a method for interacting with peers and sharing content therewith devoid of the above limitations.

SUMMARY OF THE INVENTION

The present embodiments comprise a portable cellular enhancer and a method for sharing user-defined media content with one or more peers in the proximity of the portable cellular enhancer. The portable cellular enhancer comprises a repository for storing user defined media content, such as one or more webpages, media files, etc., as described below, and a wireless interface for polling one or more communication entities of the peers in the proximity of the portable cellular enhancer and to establishing wireless network therewith. The wireless network allows the communication entities to access the stored media content. In such a manner, the user of the portable cellular enhancer shares the stored media content with the communication entities.

In one embodiment of the present invention, the portable cellular enhancer further comprises a WLAN interface for establishing a communication link with one or more local computing units and wireless network access points. In such an embodiment, a user may use the portable cellular enhancer as a gateway that connects her communication entity with local and remote communication entitles of peers. The connection with local communication entitles is established via a WPAN, as described below, and the connection with remote communication entitles is established via the wireless network access points and the Internet, as described below.

In such an embodiment, the portable cellular enhancer extends the services and capabilities of a local communication entity, such as a mobile phone, inter alia to facilitate voice over IP (VoIP) sessions, file transfer, and data streaming between one or more of the communication devices and one or more network nodes, as described below.

In embodiments of the present invention, the portable cellular enhancer comprises modules for facilitating spontaneous interactions between a number of local and remote communication entities, such as cellular phones and personal computers. Optionally, the portable cellular enhancer establishes one or more communication links that allow the communication entities to access simultaneously the same data or application using the portable cellular enhancer. The portable cellular enhancer expands the communication options of the user with remote and local peers and improves his ability to access data, optionally using her mobile phone.

In one embodiment of the present invention, a supporting apparatus for forwarding processed media content to a mobile phone in proximity thereto is described. In addition, the supporting apparatus optionally provides the mobile phone with a number of enhancements, such as a voice machine, content library, etc., which are optionally controlled by the mobile.

The supporting apparatus comprises an input unit for receiving media content. The media content is either received from a repository, which is preferably a removable repository such as a portable flash memory or from an external source, such as a network node, as described below. Optionally, the supporting apparatus further comprises a processing unit for processing the received media content and a wireless interface. The wireless interface establishes a WPAN connection, optionally bi-directional, with the mobile phone, or directly with accessories thereof, such as a wireless headphone, and forwards the media content, which is optionally processed, thereto. In addition, the Bi-directional WPAN connection is used for receiving operational instructions for the supporting apparatus from the mobile phone. Operational instructions may be understood as control signals, data, and commands transmitted by the communication entity.

Unless otherwise defined, all technical and scientific terms used herein have the same meaning as commonly understood by one of ordinary skill in the art to which this invention belongs. The materials, methods, and examples provided herein are illustrative only and not intended to be necessarily.

Implementation of the method and the apparatus of the present invention involve performing or completing certain selected tasks or steps manually, automatically, or a combination thereof. Moreover, according to actual instrumentation and equipment of embodiments of the method and the apparatus of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and the apparatus of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of exemplary embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF EXEMPLARY EMBODIMENTS

Figure 1:
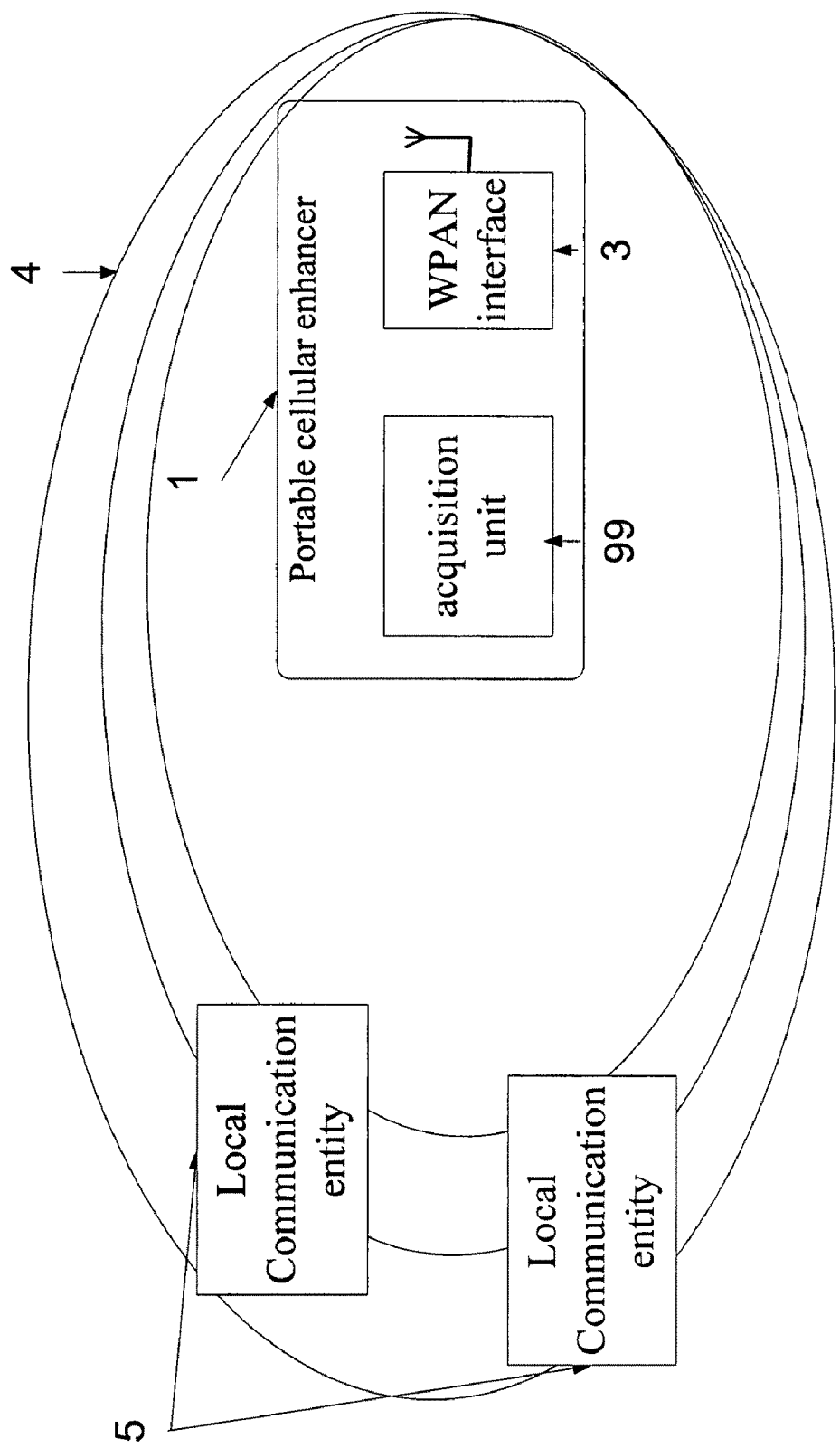
FIG. 1 is a schematic illustration of a portable cellular enhancer for forwarding processed media content to mobile phones in proximity thereto, according to an embodiment of present invention.

The principles and operation of an apparatus and method according to some embodiments of present invention may be better understood with reference to the drawings and accompanying description.

Before explaining at least one embodiment of the invention in detail, it is to be understood that the invention is not necessarily limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Dynamic media content may be understood as a website such as a Blog or a webspace, a link to a website such as a Blog or a webspace, or any multimedia content, such as audio, video, and text, which is periodically updated;

Fixed Media content may be understood as an audio sequence, a video sequence, an audio file, a video file, a segment of text, a multimedia content, a paragraph, etc.

Media content may be understood as a fixed or dynamic Media content.

A communication entity may be understood as a mobile phone, a dual-mode phone, a PDA that is capable of wirelessly transferring information over cellular networks or any other system or facility that is capable of wirelessly and directly transferring information over cellular networks.

A computing unit may be understood as a personal computer, and a laptop.

Reference is now made to FIG. 1, which is a schematic illustration of a portable cellular enhancer 1 for forwarding processed media content to at least one of a plurality of local communication entities in proximity thereto, according to one embodiment of the present invention. It should be noted that proximity may be understood as a range between a few meters and few dozens of meters. The supporting apparatus comprises an acquisition unit 99 for acquiring media content and a wireless interface, such as the depicted wireless personal area network (WPAN) interface 3. The WPAN interface 3 is designed for establishing WPAN network 4, which may be referred to as WPAN connections, with one or more of the communication entities 5. The WPAN connections allow the portable cellular enhancer to forward the processed media content to one or more of the communication entities 5. As media content is already processed, such an embodiment may reduce the computational complexity of handling the media content that is needed from the communication entities 5, as described below. The WPAN connections may be used for receiving operational instructions from one or more of the communication entities 5. In such a manner, a communication entity, such as a mobile phone, is used to control the functions of the portable cellular enhancer or handle the data that is stored in the repository.

The portable cellular enhancer 1, which may be provided without a man machine interface (MMI) or a partial MMI, is manipulated by the MMI of the communication entity. For example, a user may control the portable cellular enhancer 1 using a keypad of a mobile phone that is connected thereto via a WPAN connection, as described above.

Figure 2:
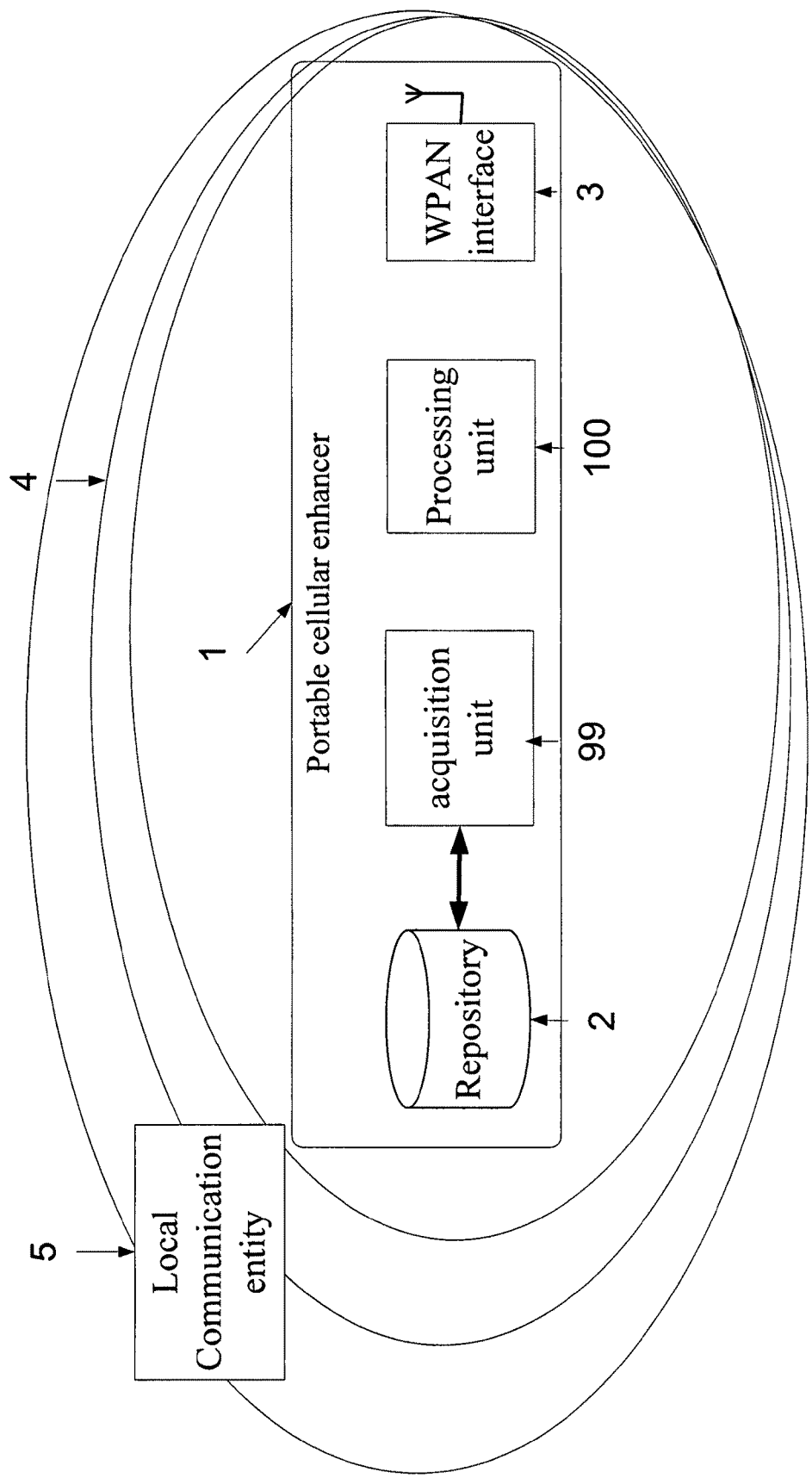
FIG. 2 is a schematic illustration of a portable cellular enhancer for supporting media content sharing between a user and one or more communication entities, such as mobile phones, according to an embodiment of present invention.

Reference is now made to FIG. 2, which is another schematic illustration of the portable cellular enhancer 1, according to one embodiment of the present invention. FIG. 2 depicts the portable cellular enhancer 1 as a portable cellular enhancer 1 that allows a user to share media content with one or more the local communication entities 5, such as mobile phones, according to one embodiment of the present invention. The portable cellular enhancer 1 is as depicted in FIG. 1, however further comprises a processing unit 100 for processing the acquired media, content a repository 2, such as a non-volatile memory (NVM) or dynamic random access memory (DRAM) for storing media content provided by the user of the portable cellular enhancer, as described below.

The wireless interface is optionally a WPAN interface 3 for setting up a communication link with one or more local communication entities 5, such as mobile phones, in the proximity to the portable cellular enhancer 1 and establishing a wireless network 4, such as a WPAN, therewith. Optionally, the local communication entities 5 are polled before the communication link is established. Optionally, the wireless interface 3 that establishes the WPAN 4 comprises a short-range radio interface, such as a Bluetooth™ transceiver, which is defined according to IEEE 802.15.1 specification that is incorporated herein by reference, optionally utilizing a Bluetooth™ enhanced data rate (EDR) chip that is defined according to Bluetooth™ core specification version 2.0+EDR of the Bluetooth™ special interest group (SIG), which is incorporated herein by reference, or a Wibree® transceiver. Optionally, the WPAN interface 3 comprises a radio transceiver that uses ultra-wideband (UWB) frequencies. In such an embodiment, the wireless interface 3 may establish the WPAN 4 according to WiMedia™ specification or according to the Wireless USB (WUSB), which are incorporated herein by reference.

Optionally, the WPAN interface 3 supports a serial port profile (SPP) connections between the portable cellular enhancer 1 and the communication entities 5. Such a profile is based on the European telecommunications standards institute (ETSI) TS 07.10 specification and uses the RFCOMM protocol, which are incorporated herein by reference. In such an embodiment the portable cellular enhancer 1 emulates a serial cable based serial communications applications, including familiar control signals. In such an embodiment the WPAN interface 3 may use a connection manager for managing the WLAN connections.

The range of the WPAN 4 may be between a few meters and few dozens of meters. The WPAN 4 provides the local communication entities 5 with access to the media content that is stored in the repository 2 and optionally one or more additional functions, such as described below. In such a manner, the user of the portable cellular enhancer 1 shares the stored media content with the peers, who are using the local communication entities 5.

Figure 4B:
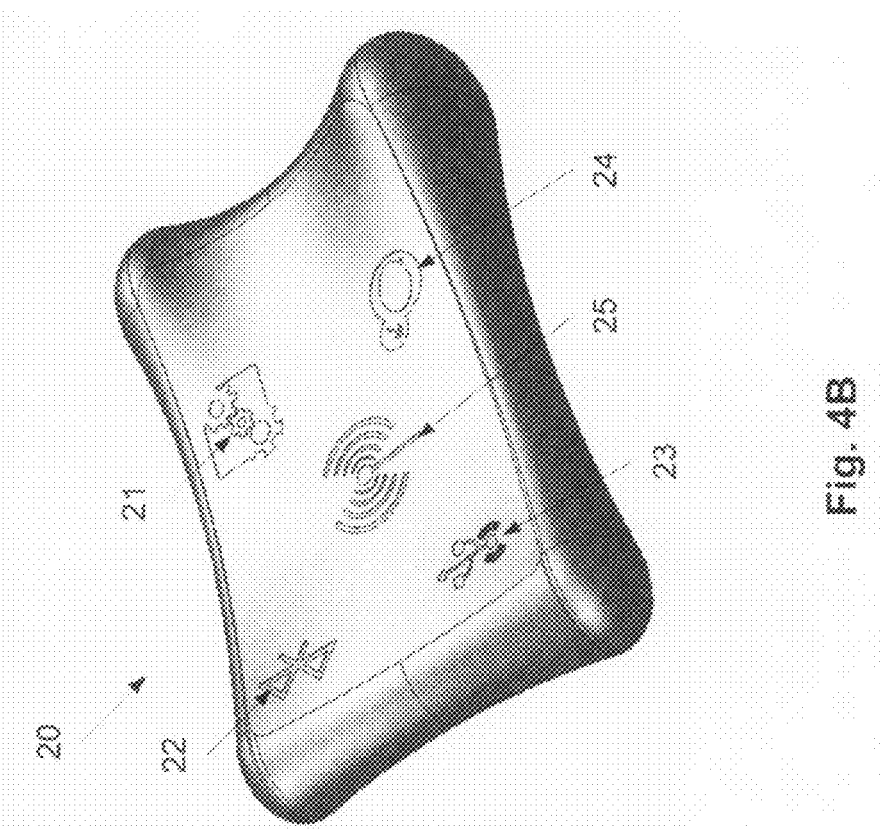
FIG. 4B is a schematic illustration of exemplary housings that enclose the components of the portable cellular enhancer, according to an embodiment of present invention.

Optionally, the portable cellular enhancer 1 is designed as a pocket-sized computing device, such as a keychain gadget, allowing the user to carry it to wherever he or she goes. Optionally, the portable cellular enhancer 1 is a handheld device that is small enough to be held in the hand of the user, for example as depicted in FIG. 4B. Optionally, the portable cellular enhancer 1 is integrated into a mobile phone.

Optionally, the media content may include and be accessible as a personal web-space that contains information that has been uploaded by the user, such as, personal profile, pictures, music, and contact details. The portable cellular enhancer 1 allows the user of a local communication entity 5 to browse the repository, select a file or a webpage, and display it on the display the local communication entity 5.

As described above, in one embodiment of the present invention, the portable cellular enhancer 1 may establish the WPAN 4 with more than one local communication entity 5.

In such an embodiment, the portable cellular enhancer 1 may be used for supporting communication between two or more peers and the user. For example, the portable cellular enhancer 1 may support communication links between the local communication entity 5 of the user and one or more local communication entities of peers. The communication links allow the user to extend the services and capabilities of her local communication entity 5. For example, the communication links allow the user to participate in a chat or a game with one or more peers, to manage the sharing of the media content, and/or to send media content to one or more of the peers, for example as described below. It should be noted that as the modules and application that support such services are installed in the portable cellular enhancer 1, resources of local communication entity 5, such as computational and communicational resources may be used for performing other tasks. For example, as further described below, the user may participate in a VoIP conference that is established and managed by the portable cellular enhancer 1. The participation of the user in such a VoIP conference does not stop her from browsing through menus of her local communication entity 5 or using it for establishing an additional call. Moreover, as the services and capabilities are supported by the portable cellular enhancer 1, the local communication entity 5 does not have to support them. For example, a user may use the local communication entity 5 for accessing an audio file that is stored in the repository 2 of the portable cellular enhancer 1, playing it using a player module that is hosted in the portable cellular enhancer 1 and listen thereto using the local communication entity 5, after a stream if the played audio file is forwarded to the local communication entity 5 via the WPAN 4, as further described below. It should be noted that as the aforementioned capabilities and services are processed by the portable cellular enhancer 1, battery power that would have been spent if they have been processed by the connected local communication entity 5 is saved.

The portable cellular enhancer 1 optionally does not function as a cellular phone. Therefore, the portable cellular enhancer 1 does not have an active cellular transceiver that is designed to stay constantly in connection with a mobile station, such as a wireless RF module. As such, an active cellular transceiver is constantly in connection with the close mobile station, it has relatively high power consumption, even when it is in an idle mode. The power consumption increases as the active cellular transceiver draws away from the mobile station. For example, if the communication entity, which has an active cellular transceiver, is located in a weak signal strength area where it is difficult to receive radio signals, its battery time is reduced, compared to when a communication entity that is located in an area where it receives normal radio signals. As the portable cellular enhancer 1 does not have such an active cellular transceiver, it has a lower power consumption when it is idle than a communication entity, such as a cellular phone.

Figure 3:
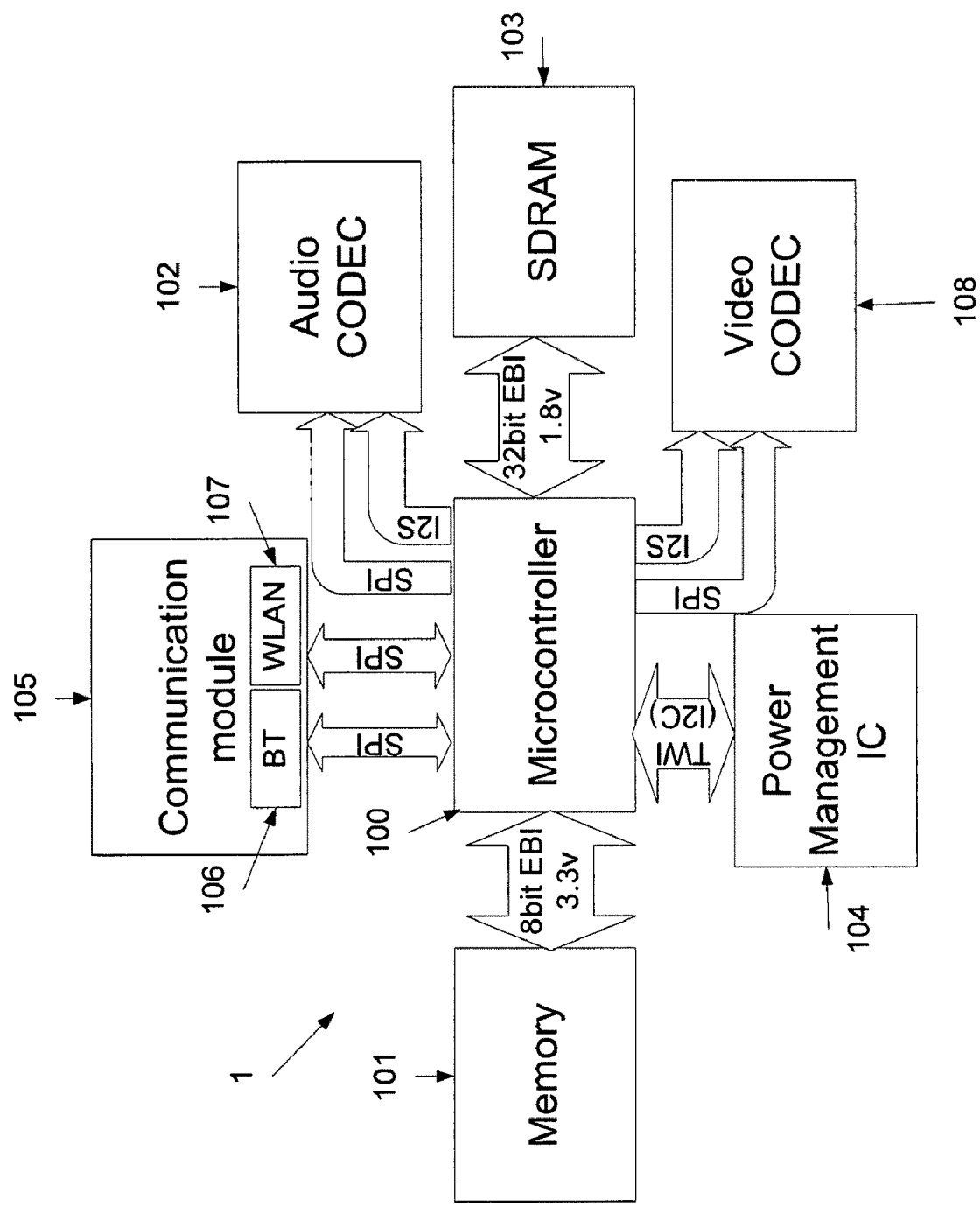
FIG. 3 is a block diagram of the portable cellular enhancer of FIG. 2, according to one embodiment of the present invention.

Reference is now made to FIG. 3, which is a block diagram of the portable cellular enhancer 1, according to one embodiment of the present invention. As depicted in FIG. 3, the portable cellular enhancer 1 comprises a microcontroller 100, a memory 101, an audio coder/decoder (CODEC) 102, a synchronous dynamic random access memory (SDRAM), a power management integrated circuit (IC) 104, and a communication module 105 that functions as the aforementioned WPAN interface and optionally as a WLAN interface, as further described below. The microcontroller 100 optionally comprises a reset controller, a shutdown controller, a memory management unit (MMU), a clock management unit, an advanced interrupt controller (AIC), a debug unit (DBGU), a periodic interval timer, a watchdog timer and a real-time timer. Optionally, the microcontroller 100 is Atmel™ AT91SAM9260 microcontroller, which the specification thereof is herein incorporated by reference. As depicted in FIG. 3, the microcontroller 100 is connected, optionally via a 32 bit external bus interface (EBI), to the SDRAM 103 and via an 10 Bit EBI to the memory 101 that is optionally a NOT AND (NAND) flash device that hosts the aforementioned repository.

The microcontroller 100 is further connected, optionally via a two-wire interface (TWI), to the power management IC 104. The power management IC 104 contains battery charging and control circuitries with universal serial bus (USB) and alternating current (AC) charging support for supplying power to the components of the portable cellular enhancer 1. Optionally, the power management IC 104 is connected to built-in battery housing with rechargeable batteries that provides the needed power. Optionally, one or more lithium polymer (Li—Po) rechargeable cells or batteries, which are rated at 3.7 v, are used as power source.

Optionally, the microcontroller 100 is connected, via a serial peripheral interface (SPI), to the audio CODAC 102 that is optionally a Texas Instrument™ TLV320AIC26 audio CODEC having the specification thereof incorporated herein by reference. The audio CODAC 102 optionally comprises a headphone amplifier that allows the user to connect a wired headset to the portable cellular enhancer 1, a two channels playback digital to analog converter (DAC), a one channel recording analog to digital converter (ADC), that optionally allows the user to connect a wired microphone to the portable cellular enhancer 1, an SPI control input, and an electrical serial bus interface, such as $I^2S$ data input. As further described below, the audio CODAC 102 allows the user of the portable cellular enhancer 1 to, inter alia, establish a VoIP session, and listen to audio files, which are stored in the memory 101, etc.

Optionally, the microcontroller 100 is connected, via a serial peripheral interface (SPI), to a video CODAC 108. The video CODAC 108 optionally comprises a video output such as a digital video input (DVI) output, a high-definition multimedia interface (HDMI) output, and/or a connection to a UWB interface. As further described below, the video CODAC 108 allows the user of the portable cellular enhancer 1 to, inter alia, connect the portable cellular enhancer 1 to an external screen display, such as a digital TV (DTV). In such an embodiment, the portable cellular enhancer 1 may stream or render files, which are stored in the memory 101, or streams, which are received via the communication module 105, wirelessly or via a wired connection, to the connected DTV.

As described above, the microcontroller 100 is connected, optionally via an SPI, to the communication module 105, which is optionally a Texas Instruments® LBEE1W3HDC module, which the specification thereof is herein incorporated by reference.

As depicted in FIG. 3, the communication module 105 comprises the aforementioned WPAN interface 106 and optionally a WLAN interface. The communication module 105 is optionally a chip that integrates WPAN, WLAN, and power management with a coexistence support through the power management IC 104. The WLAN interface allows the portable cellular enhancer 1 to establish a connection with another computing unit, either directly or via the internet and the access point, as described below. It should be noted that the WPAN and the WLAN interfaces may be implemented on different chips. Optionally, the WPAN interface, the WLAN interface, or both are detachable add-ons, which are designed to be integrated into the portable cellular enhancer 1 when needed. Optionally, the communication module 105 is connected to external Balun and Filter modules for improving the performances of the WLAN and WPAN interfaces. Optionally, a WPAN/WLAN shared antenna solution is used for both interfaces.

Optionally, the communication module 105 is connected to or integrates a cellular transceiver and modulator/demodulator (modem). In such an embodiment, the WLAN interface may establish a cellular connection using a data transmission technique that preferably transmits and receives data in packets, such as a general packet radio service (GPRS) connection or enhanced data rates for global evolution (EDGE) connection, which the specifications thereof are incorporated herein by reference. In such an embodiment, the portable cellular enhancer 1 may use the cellular transceiver and modem to establish WLAN connections to a cellular network. Optionally, the portable cellular enhancer 1 establishes a WLAN connection via the cellular network when the WLAN interface cannot establish wireless connections with a computing unit or an access point, as described below.

Optionally, the WPAN interface supports a protocol stack on real-time operating system (RTOS) and may be connected to WinM and Symbian native stacks. In addition, if the microcontroller 100 runs a Linux based operating system, the solution connects to the BlueZ stack.

Figure 4A:
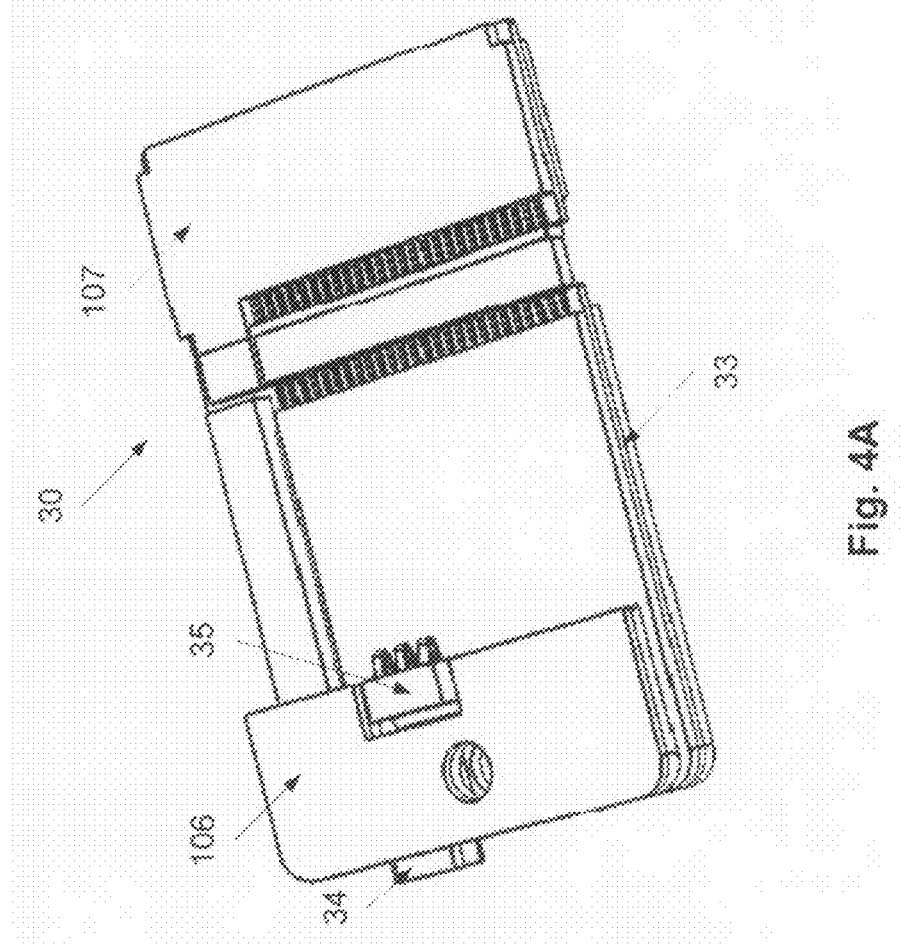
FIG. 4A is a schematic illustration of an exemplary IC that hosts electronic components of the portable cellular enhancer, according to one embodiment of the present invention.

Reference is now made to FIG. 4A, which is a schematic illustration of an exemplary IC 30 that hosts the electronic components of the portable cellular enhancer 1, according to one embodiment of the present invention. The exemplary IC 30 hosts the WPAN interface 106, the WLAN interface 107 in opposite sides and the other electronic components, for example the microcontroller 100 in the center thereof 33. A battery connection that is used for supplying power to the power management IC is shown at 35.

The portable cellular enhancer optionally comprises one or more ports, both for wired and for wireless protocols. In such an embodiment, the portable cellular enhancer may be used as an expansion port for the local communication entity device. The same ports may be used for providing power, downloading and uploading data, etc. For example, portable cellular enhancer comprises a USB interface 34, which is used for charging the battery of the portable cellular enhancer and connecting a storage device, such as a memory drive, as described below. Optionally, USB interface may comprise a host controller for allowing the portable cellular enhancer 1 to connect to and charge network and storage devices.

Optionally, the USB interface allows the user to connect the portable cellular enhancer to a hosting computing unit, such as a personal computer or a laptop. In such an embodiment, the portable cellular enhancer 1 may be used as a flash drive and the records, which are stored in the repository, may by uploaded, accessed, updated, and/or edited using the hosting computing unit.

As described above, the portable cellular enhancer 1 comprises a WLAN interface 107. Optionally, the may be used as a USB network card that allows the hosting computing unit to establish a wireless connection with a WAP or the like and to receive and send information therethrough.

Optionally, the portable cellular enhancer further comprises a USB hub that allows many USB devices to be connected to a single USB port on the portable cellular enhancer 1.

The portable cellular enhancer 1 optionally comprises a memory card reader for reading content that is stored in memory cards. The memory cards are optionally solid-state electronic flash memory data storage devices such as CompactFlash™ cards, SmartMedia™ cards, Memory Stick™ cards, Secure Digital™ cards, miniSD™ cards, or MicroSD™ cards.

The components of the portable cellular enhancer 1 are mounted in a housing that contains the necessary electric circuit and provides a means of access to the batteries for replacement and a means of access to USB interface. An exemplary schematic illustration of such a housing is depicted in FIG. 4B, which is a schematic illustration of exemplary housings 20, as described above. A more detailed description of the MMI that is depicted in FIG. 4B, as shown at 21-25, is given below.

Optionally, the portable cellular enhancer 1 interfaces with a docking station that is connected to a communication entity or with a computing unit, such personal computer. In such an embodiment, when the portable cellular enhancer 1 is placed in the docking station, the aforementioned batteries are charged and the media content is updated, copied, uploaded, and downloaded by the communication entity or the computing unit that is connected to the docking station. For example, the operating system or any other module of the portable cellular enhancer 1 is updated by the communication entity or the computing unit that is connected to the docking station.

Optionally, the portable cellular enhancer 1 is used as a portable docking station for a communication entity. In such an embodiment, when the communication entity is connected to the portable cellular enhancer 1, for example using a USB connection via the above mentioned USB interface. Optionally, the aforementioned batteries may be used for charging the portable cellular enhancer 1 via the established connection. Optionally, the media content that is stored in the repository 2 may be used for updating records in the communication entity 5 that is connected to the portable cellular enhancer 1.

Optionally, the portable cellular enhancer 1 is associated with the communication entity of the user, optionally her mobile phone. For example, the portable cellular enhancer 1 and mobile phone of the user are defined as a trusted pair. When the portable cellular enhancer 1 recognizes the mobile phone of the user, or vice versa, each device automatically accepts communication from the other, and bypasses any discovery and authentication process that normally happens during such communication interactions. The user uses the associated communication entity to control the portable cellular enhancer 1.

Optionally, the portable cellular enhancer 1 further comprises an audio jack input plug that allows the user to connect the portable cellular enhancer 1 to a wired audio device, such as a headset or a set of wired speakers.

Optionally, the portable cellular enhancer 1 further comprises a microphone jack input plug that allows the user to connect the portable cellular enhancer 1 to a microphone.

Optionally, the portable cellular enhancer 1 establishes a WPAN connection with the local communication entity in which the portable cellular enhancer 1 is connected as a wireless headset, a wireless speakerphone or a set of wireless speakers to the communication entity 5. In such a manner, the portable cellular enhancer 1 allows the user to use wired audio devices are wireless audio devices.

Optionally, as depicted in FIGS. 4A and 4B, the portable cellular enhancer 1 does not comprise an input unit, such as a keypad or a keyboard and a display device such as a screen. In such an embodiment, a designated MMI in the mobile phone of the user may be used for controlling the portable cellular enhancer. Such a designated MMI may be installed as an applet in the memory of the mobile phone. The applet allows the user to use her mobile phone as an MMI that controls the portable cellular enhancer. In such a manner, the user may use the mobile phone to control the functioning, the setting, the mode, and the power of the portable cellular enhancer 1. Optionally, the user uses the keypad of the mobile phone, or any other input unit thereof, as an input interface and the screen display of the mobile phone for displaying indications received from the portable cellular enhancer.

Figure 5:
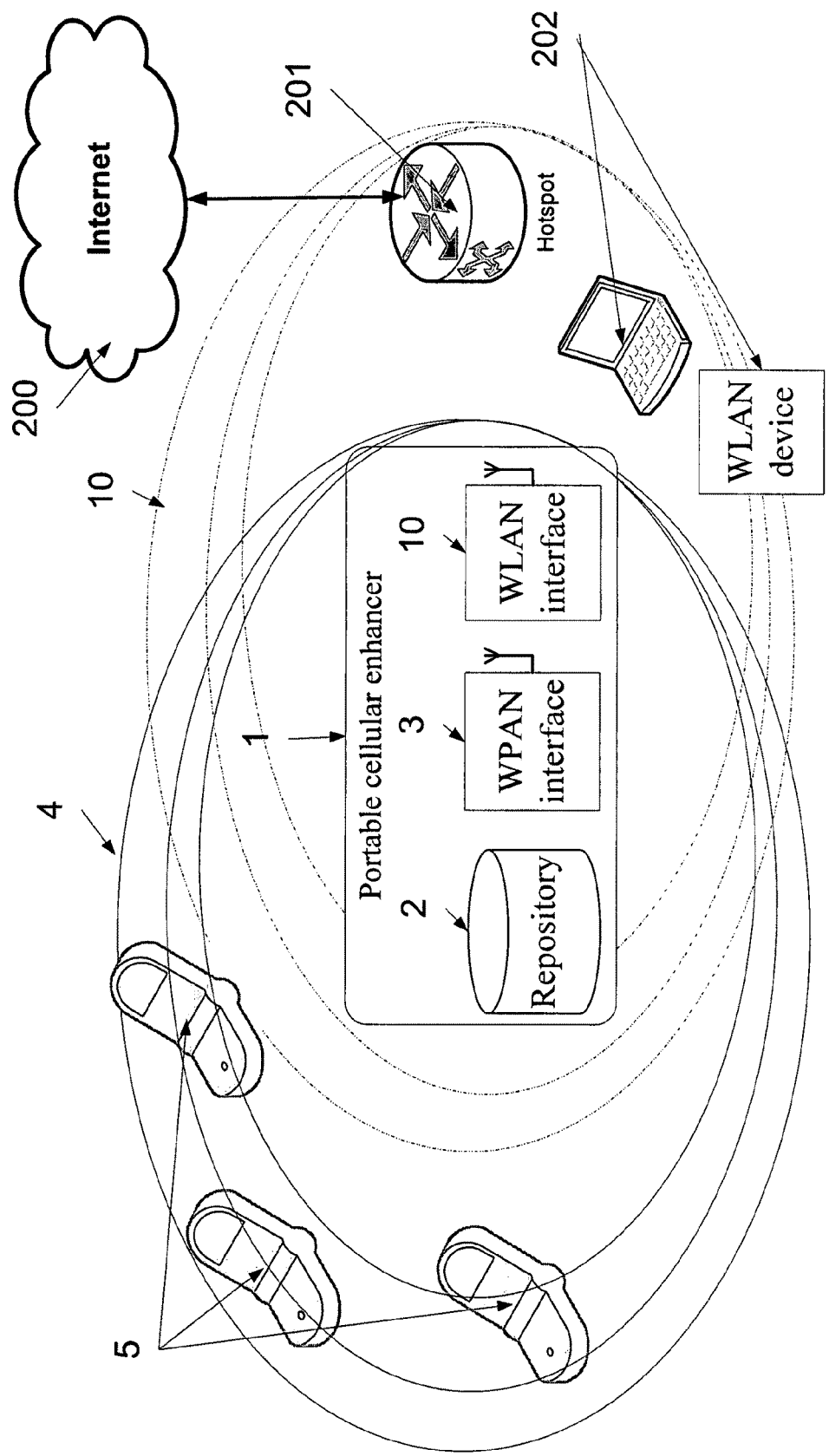
FIG. 5 is a schematic illustration of the portable cellular enhancer of FIG. 2 with a WLAN interface, according to one embodiment of the present invention.

Reference is now made to FIG. 5, which is a schematic illustration of the portable cellular enhancer 1, according to one embodiment of the present invention. The repository 2, the WPAN interface 3, and the WPAN 4 are as depicted in FIG. 2. However, in FIG. 5 the portable cellular enhancer 1 comprises the WLAN interface 107, which is depicted in FIG.

3, for establishing a communication link (not shown), via the WLAN 200, with a network access point 201, such as a hotspot, which is connected to the Internet 203, a local computing unit 202, such as a laptop or both.

The WLAN interface 107 is optionally a radio transceiver that uses high frequency radio signals, which are defined according to a WLAN standard, such as 802.11a, 802.11b, 802.11g, and 802.11n standards, which are herein incorporated by reference. The WLAN interface 107 optionally uses high frequency radio signals. In such an embodiment, the WLAN interface 107 is defined according to WiMAX™ IEEE 802.16 standard or wireless FireWire IEEE 802.15.3 standard, which are incorporated herein by reference.

The WLAN interface 107 may be controlled to sequentially poll for an access to the internet 200. In such an embodiment, the WLAN interface 107 looks for hotspots that allow conditional or unconditional connections. The WLAN interface 107 may be designed to connect using one or more available connections, such as a Wi-Fi™ connection, a Bluetooth™ connection, a WiMAX™ connection, etc.

When such a communication link is found, the portable cellular enhancer 1 automatically establishes a connection therewith and with the local communication entity 5 of the user, as described above. Optionally, predefined content is downloaded, uploaded, updated, or backed up automatically, as described below.

As described above, the portable cellular enhancer 1 comprises both the WPAN and the WLAN interfaces 3, 107. Such an embodiment allows the portable cellular enhancer 1 to function as a gateway that connects the WPAN 4 and the WLAN 10. In such an embodiment, the portable cellular enhancer 1 routes data packets between one of the local communication entities 5 and a local computing unit that is directly connected to the WLAN, as shown at 202, or a remotely located computing unit that is connected to the Internet and accessible via the wireless network access point 201.

Optionally, the portable cellular enhancer 1 comprises a cellular transceiver and modem for establishing a wireless connection, such as a GPRS connection or an EDGE connection, with the Internet 200 via a cellular network (not shown). In such an embodiment, the portable cellular enhancer 1 may be connected to the Internet even when there is no network access point in the proximity thereof. For clarity, as the portable cellular enhancer 1 comprises a cellular transceiver and modem, any WLAN connection may also be understood as any communication that is established using packet technology to send and/or receive data via computer and/or cellular networks.

Optionally, the portable cellular enhancer 1 acts as an access point. In such an embodiment, the portable cellular enhancer 1 establishes a cellular connection such as an EDGE connection using the cellular transceiver and modem. The cellular connection allows the local communication entities 5 access the Internet via the WPAN and/or the WLAN interfaces 3, 107.

The user 304 may interact with peers, which are connected both to the WPAN and to the Internet. For example, the user 304 may participate in a multiplayer game, a VoIP call, a conference call, or file sharing with one or more other remote players, which are connected to the Internet, as described below. It should be noted that such routing abilities are provided to the user 304 even of her communication entity 5 has limited capabilities. In particular, the processing of the routed media content is performed on the portable cellular enhancer 1. The communication entity 5 only has to receive and display the processed media content. Thus, even of the communication entity 5 does not support advanced capabilities such as VoIP or have a processor that supports multiplayer games or file sharing, the user 304 can enjoy these advanced capabilities by connecting her limited communication entity 5 to the portable cellular enhancer 1.

The portable cellular enhancer 1 is used as a bridge between the mobile phone and the access point 201 and provides the mobile phone with other advanced feature are described below.

Optionally, the portable cellular enhancer 1 establish the connection between the access point 201 and the communication entity 5 according to the dynamic host configuration protocol (DHCP), which is incorporated herein by reference. The protocol allows the portable cellular enhancer 1 to request and obtain an IP address for the communication entity 5.

As described above, the portable cellular enhancer 1 is used for allowing a number of communication entities 5 to establish a LAN connection with the access point 201. Optionally, the portable cellular enhancer 1 performs a network address translation (NAT) to the packets, which are transmitted between the communication entity 5 and the access point 201. The NAT involves re-writing the source and/or destination address of IP packets as they pass through the portable cellular enhancer 1. In such an embodiment, the portable cellular enhancer 1 allows multiple communication entities 5 to access the Internet using the IP address of the portable cellular enhancer 1.

It should be noted that such a portable cellular enhancer may be used to connect a simple mobile phone without a WLAN interface or network capabilities to the Internet or to another computer network.

Optionally, the portable cellular enhancer 1 comprises a web format converter or another module for allowing the simple mobile phone to instantly access and interacts with information and services such as wireless application protocol (WAP) based information and services. Optionally, the portable cellular enhancer 1 comprises a web format converter adjust the display format, the display transcoding, the resolution, and/or the encoding of the information and services which are provided via the WLAN connection, according to the characteristics and capabilities of the communication entity 5.

Figure 6:
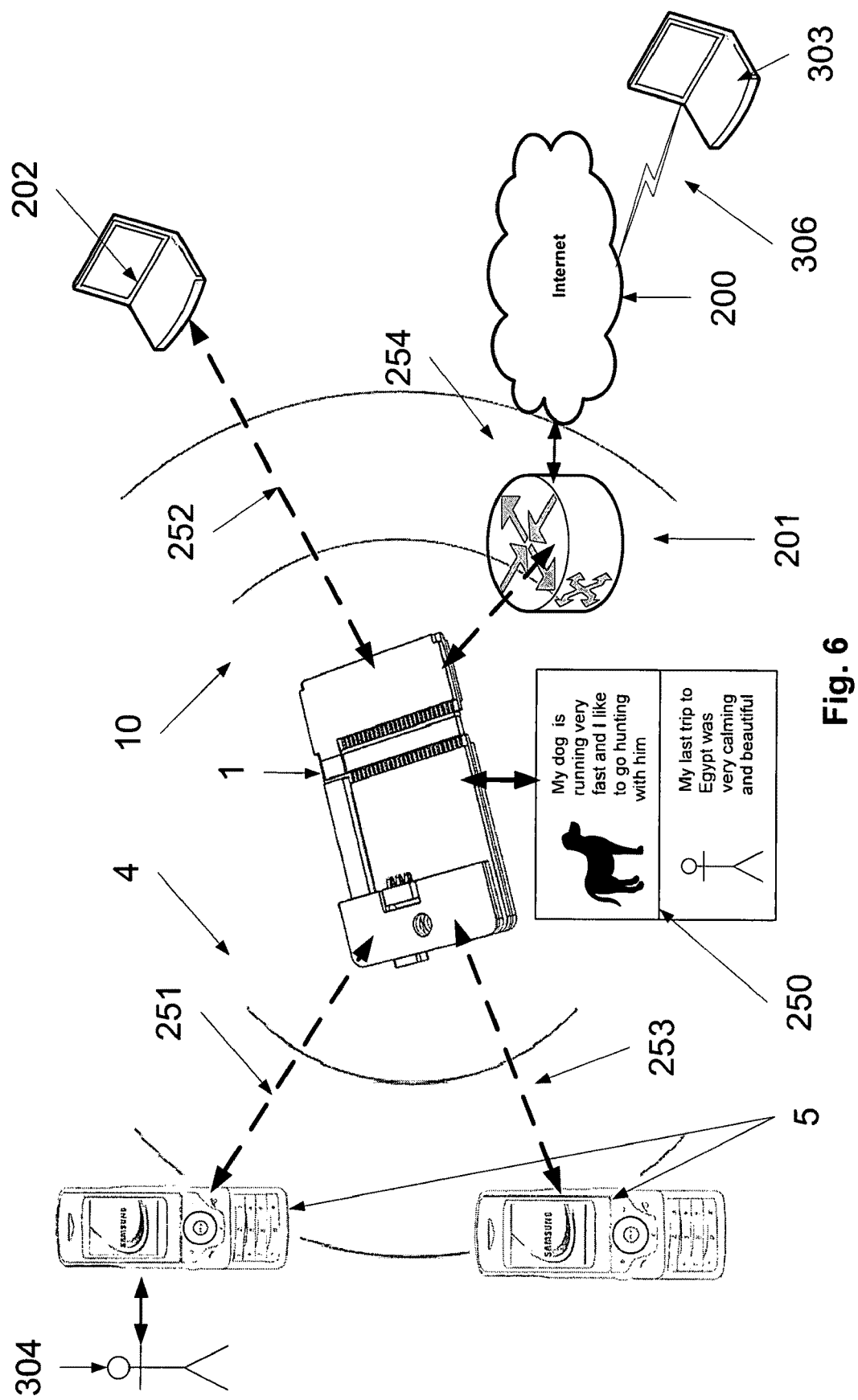
FIG. 6 is a schematic illustration of the portable cellular enhancer of FIG. 5 and a number of entities it shares media content with, according to one embodiment of the present invention.

Reference is now made to FIG. 6, which is a schematic illustration of the portable cellular enhancer 1 and entities it shares media with, according to one embodiment of the present invention. The portable cellular enhancer 1, the internet 200, the local communication entities 5, the local computing unit 202, and the network access point 201 are as in FIG. 5. However, FIG. 6 further depicts a virtual site 250 that is hosted on the repository of the portable cellular enhancer 1 and accessible through the WPAN 4 and optionally the WLAN 10, as described below. The figure further depicts a remotely located computing unit 303 and four communication links 251, 252, 253, and 254. Optionally, each link establishes bi-directional parallel communication between the portable cellular enhancer 1 and one of the entities 5, 202, and 303.

The embodiment that is depicted in FIG. 6, allows the user 304 to share the media content that is stored in the virtual site 250 with peers, who are located in the proximity of the portable cellular enhancer, and optionally with peers who are remotely located, as described below. It should be noted that the proximity may be defined as 3 m, 10 m, and 100 m, for example based on the technical limitations of the WPAN interface. For example, if the WPAN interface is defined with 100/20 maximum permitted power (mW/dBm) the proximity is defined as approximately 100 meters and if the WPAN interface is defined with 2.5/4 mW/dBm the proximity is defined as approximately 10 meters.

Optionally, the user uploads media content that comprises personal or business information to the virtual site 250 on the repository of her portable cellular enhancer 1.

The uploaded media content, which is available to peers in the proximity of the user may trigger preferred peers in the proximity thereof to approach him or her and may keep away others from doing so. Such a portable cellular enhancer may be used for increasing the productivity of business conferences or singles meetings. For example, in relation to business conferences, the user may upload his area of specialty to the virtual site 250, thereby to trigger colleagues that look for an artisan with such skills to approach him. In another example, in relation to singles meetings, the user may upload his area of interest, thereby to trigger singles with common area of interest to approach him. Optionally, the uploaded media content defines the characteristics of the peers with which the user prefers to meet in person. For example, the user may upload characteristics of the mate that he or she is looking for.

In one embodiment of the present invention, the virtual site 250 is a personal webspace, a personal web home page, or a Blog. A peer, who is located in the near proximity of the portable cellular enhancer 1, optionally less than 10 meters, may use her local communication entity 5 to access the hosted site 250, optionally via a link established over the WPAN, as shown at 253. A peer, who is located in the proximity of the portable cellular enhancer 1, may access the hosted site 250 using her computing unit 201, optionally via a communication link that is established over the WLAN, as shown at 252. Optionally, a remotely located peer may access the hosted site 250 using the remotely located computing unit 303. In such an embodiment, a link is established between the portable cellular enhancer 1 and the computing device 303, over the Internet 200 and the network access point 201, as shown at 254.

Optionally, the user 304 updates the virtual site 250, using her local communication entity 5, via the link established over the WPAN, as shown at 251, using the remotely located computing unit 303, via the links established over the Internet 200 and the network access point 201, as shown at 254, using the local computing unit 202, as shown at 252, or using a flash memory drive, as described above. Optionally, the user 304 creates, manages, and updates the virtual site 250 using her mobile phone. Optionally, the user 304 upload media content to the portable cellular enhancer 1 from her mobile phone 5 or from the local computing unit 202, as described above.

Optionally, the virtual site 250, one or more webpages thereof, or any other media content that is available therethrough are automatically updated according to one or more predefined URLs. In such an embodiment, the virtual site 250, which is stored in the repository of the portable cellular enhancer 1, is updated according to a webspace, such as a webpage, a social network profile, or a Blog, that is stored on a network node, such as a MySpace™ server or other social networking system. When a communication link 254 via the network access point 201 is established, as described above, the portable cellular enhancer 1 automatically accesses the predefined URLs and downloads all or some of the content therein.

Figure 7:
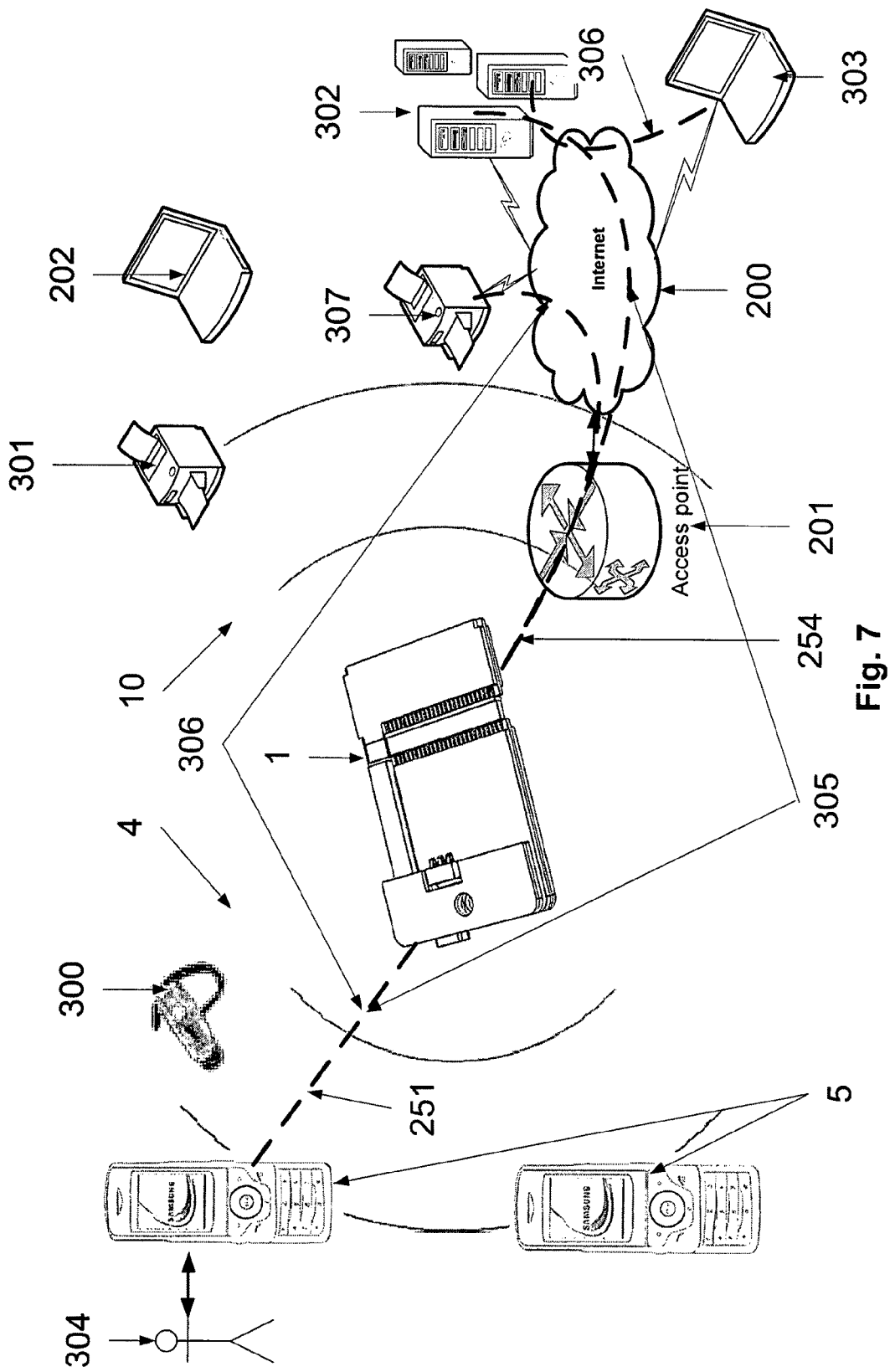
FIG. 7 is a schematic illustration of the portable cellular enhancer, according to one embodiment of the present invention.

Reference is now made jointly to FIG. 6 and to FIG. 7, which is a schematic illustration of the portable cellular enhancer 1, according to one embodiment of the present invention. The repository, the PWAN interface 3 and the 1 interface are as in FIG. 2; however, FIG. 7 further depicts a number of modules 451-461 for extending the services and capabilities which are provided by the local communication entity 5.

Optionally, the portable cellular enhancer 1 comprises an authentication module 451 for identifying the access privileges of peers who use the local communication entities 5 to the media content. Optionally, the authentication module is designed to allow the portable cellular enhancer 1 to provide one or more services only to local communication entities 5, such as mobile phones, which are manufactured or marketed by a common manufacturer or distributor, and to deny service from local communication entities 5, which are manufactured or marketed by other manufacturers or distributors.

Optionally, the portable cellular enhancer 1 comprises a peer authorization module 452 that allows the user 304 to define one or more groups of peers, optionally in lists of contacts that define peers, who are allowed to access defined items in the media content that is stored in the repository and allowed to receive one or more of the services of the portable cellular enhancer 1. In such an embodiment, the portable cellular enhancer 1 identifies the local communication entities 5, which are located in the proximity thereof, and determine whether they are in the peer is in one of the groups or not. Optionally, each record of each list comprises a combination of the personal identification number (PIN) of the communication entities of the members of the social network and optionally a Bluetooth™ address. The combinations are matched with the PIN and the Bluetooth™ address of local communication entities 5 in the proximity of the portable cellular enhancer. Optionally, only local communication entities 5 with a matching PIN and, optionally, a matching Bluetooth™ address are authorized to access the items of the media content, which are defined to her group, for example, the virtual site 250. Optionally, different access rights are defined for each one of the members in each one of the groups. Preferably, one or more of the groups are groups of social network peers, which are associated with the user 304. For example, a user may use the peer authorization module 452 to define a group of friends, which is allowed to access his private website that is hosted on the portable cellular enhancer 1.

Optionally, the peer authorization module 452 is designed to define groups of users dynamically according to one or more rules, such as a proximity rule or a time-based rule. For example, the user may define a rule that only a group of peers in a predefined proximity, such as 3 meters, can access a certain media content that is stored in the repository 2, while other can only access other media content. In another embodiment, the user 304 may define a rule that at night a group of peers can access one media content that includes personal information about her and during the day the same group of peers can access only access another media content that includes business information such as areas of specialty.

Optionally, when a peer is trying to establish a connection with the portable cellular enhancer 1, the peer authorization module 452 forwards an access request, via the WPAN connection, to the communication entity 5 that display it to the user 10. The user approves or declines the access request and uses the communication entity 5 to reply, via the WPAN connection, to the portable cellular enhancer 1 that respectively approve or decline the requested access.

Figure 8:
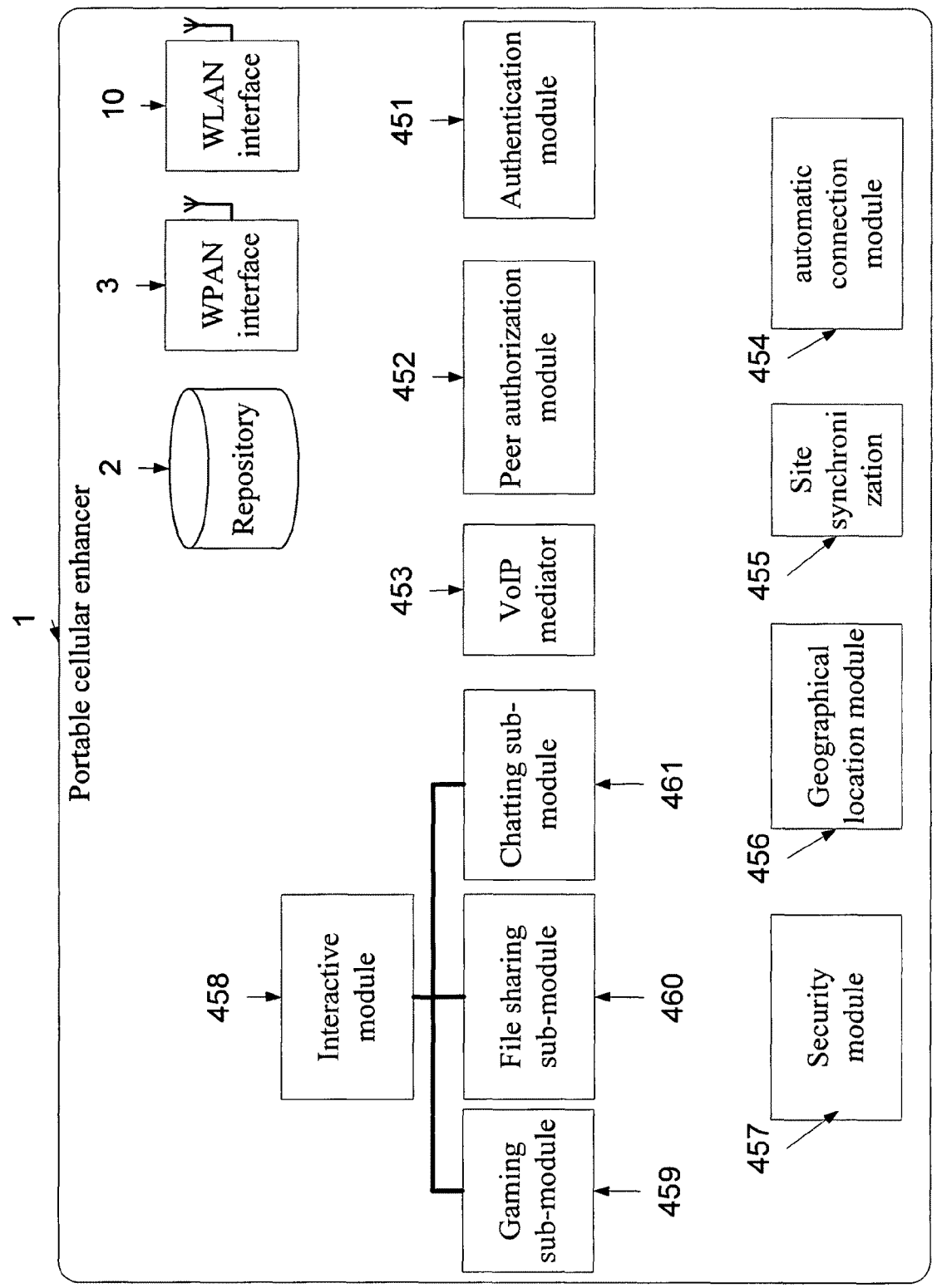
FIG. 8 is another schematic illustration of the portable cellular enhancer and entities it communicates with, according to one embodiment of the present invention.

Reference is now made to jointly to FIG. 7 and FIG. 8, which is a schematic illustration of the portable cellular enhancer 1 and entities it may communicate with, according to one embodiment of the present invention. The portable cellular enhancer 1, the internet 200, the local communication entities 5, the remotely located computing unit 303, the user 304, and the hotspot 201 are as in FIG. 5. However, FIG. 8 further depicts a wireless earphone 300, a printer 301, a server 302, a remote printer 306, a communication link between the remotely located server 302 and the remotely located computing unit 303, as shown at 306, and a communication link between the local communication entity 5 and the server 302, as shown at 305, or the remote printer 306, as shown at 307.

Optionally, the portable cellular enhancer 1 allows the user 4 to access and download media content that is stored on the server 302. As described above, the portable cellular enhancer 1 is designed to establish a communication link between one or more of the local communication entities 5, which are connected to the WPAN 4, and the network access point 201 that establishes the WLAN 10. Optionally, such a link, as shown at 305, allows the user 304 to receive a media stream, such as an audio feed, a video feed, and a podcast, from the server 302. Optionally, the media stream is associated with a really simple syndication (RSS) address, such an RSS 2.0 address. In such an embodiment, the portable cellular enhancer 1 hosts a reader that reads the RSS address and allows the forwarding of the RSS feed to the local communication entity 5 of the user 304. Optionally, the reader reads the RSS address from a list of predefined RSS addresses, which is hosted in the repository. Optionally, the list is defined by the user as a list of favorite media feeds, which are forwarded to one or more communication entities on demand.

Optionally, the earphone 300 is directly associated with the portable cellular enhancer 1 and allows the user to directly receive the aforementioned audio feed from the portable cellular enhancer 1. Such an embodiment allows the portable cellular enhancer 1, optionally in combination with the local communication entity 5 of the user, to function as a mobile media center. Briefly stated, the portable cellular enhancer 1 establishes links, as shown at 305, between the local communication entity 5 of the user 304 and one or more servers which are connected to the Internet. The servers provides media streaming of audio, such as internet radio and audio casting services, media streaming of video, such as video on demand (VOD) feeds and webTVs, or any other type of AV streaming. The established link 305 allows the playing or displaying of the media content feeds using the local communication entity 5 of the user 304.

Optionally, the portable cellular enhancer comprises a VoIP mediator or adaptor 453 that utilize the link 305 to allow the user 304 to place VoIP calls, for example with the remotely located computing unit 303. In such an embodiment, the server 302 is a VoIP server that delivers voice services over computer and converged networks, which optionally provide advanced services like caller ID and text messaging. The VoIP server complies with third generation partnership project (3GPP), European telecommunications standards institute's (ETSI), Telecoms and Internet converged services and protocols for advanced networks (TISPAN) standards, which are herein incorporated by reference. Optionally, the VoIP server 302 hosts a plug-in that co-works with Skype or MSN and with Internet Gateway supporting several phones on the other. The VoIP server 302 permits a convergence of legacy telephony with session initiation protocol (SIP)-based VoIP, thereby allow the user 304 to use her communication entity to place VoIP calls to landline and cellular destinations worldwide. For example, the server 302 may establish an additional link 306 with the remotely located client device 303, thereby allows the local communication entity 5 to communicate therewith via the links 305 and 306. In such a manner, the user 304 may participate in VoIP calls and conference call even if her portable cellular enhancer 1 does not support VoIP capabilities.

Optionally, the link 305 allows the user 304 to participate in a messaging session with a peer who is connected to the remotely located computing unit 303 or to another communication entity that is connected to the Internet. In such an embodiment, the server 302 launches one or more online chat rooms or messaging sessions and provides messaging services to the user. The server 302 allows the user, who uses the communication entity that is connected to the link 305, to communicate with the remotely located computing unit 303 via the WPAN 4, the WLAN 10, and the Internet 200.

Optionally, the communication link with the remote printer 307, as shown at 306, allows the user 304 and optionally the peers, to send printing jobs to the remote printer 307. In such a manner, the user 304, or the peers may use the portable cellular enhancer for documenting information that is gathered by the local communication entities 5. For example, a user may send the remote printer 307, via the communication link 306, a picture taken using the local communication entity 5, a printout of a short message service (SMSs), etc.

Figure 9:
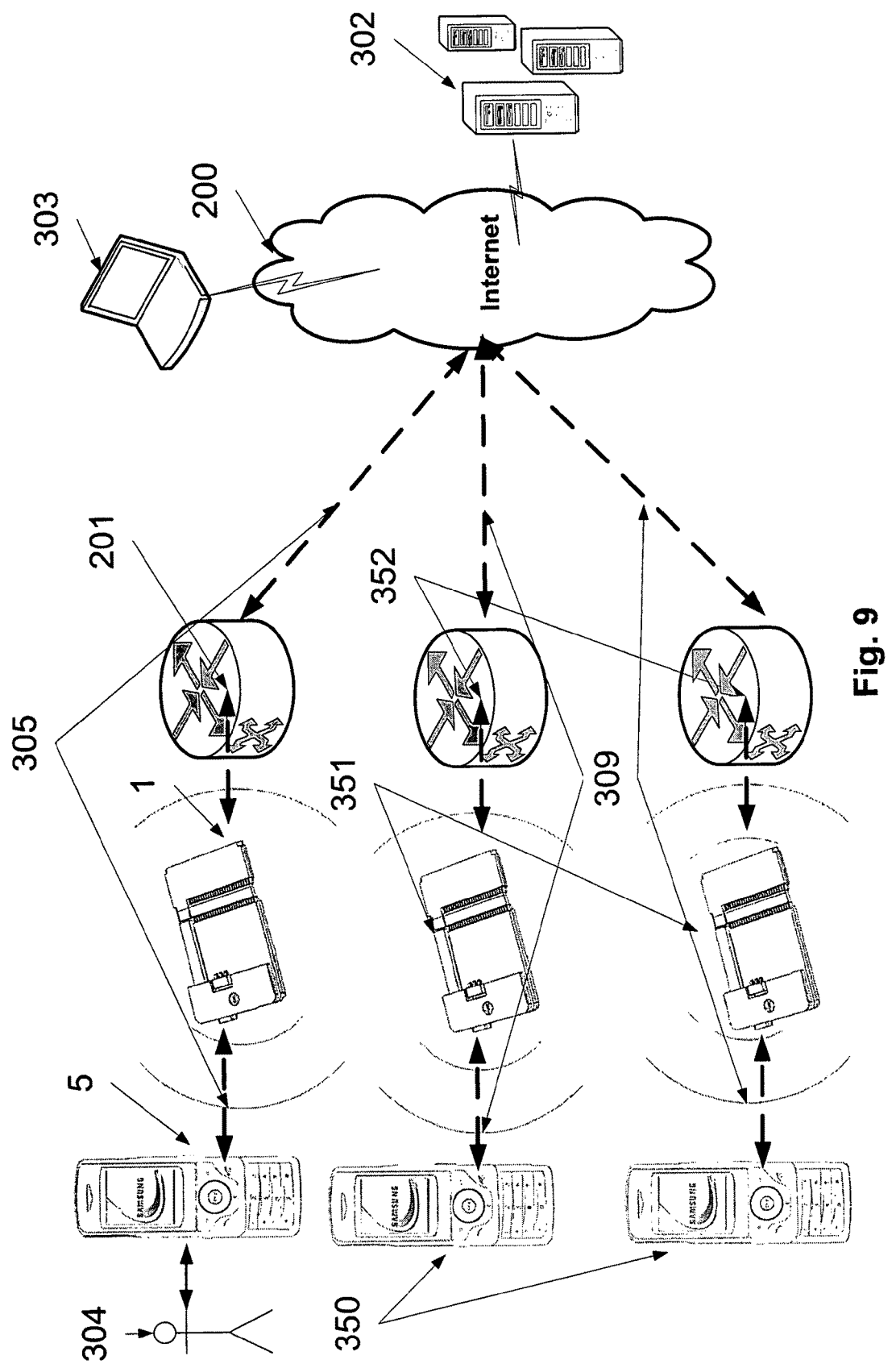
FIG. 9 is a schematic illustration of three remotely located communication entities, which are communicating with one another over the Internet, via different portable cellular enhancers, according to one embodiment of the present invention.

Reference is now made to FIG. 9, which is a schematic illustration of three remotely located local communication entities 5, 350, which are communicating with one another via different portable cellular enhancers 1, 351 over the Internet, according to one embodiment of the present invention. The user 304, the link 305, the portable cellular enhancer 1, the internet 200, the remotely located server 302, and the remotely located computing unit 303 are as in FIG. 8. However, FIG. 9 further depicts two remotely located access points 352, each connected to an additional communication entity 350 via a respective portable cellular enhancer 351. The remotely located access points 352 allows the additional communication entities 350 to establish a communication link with the Internet via the additional portable cellular enhancers 351, as shown at 309.

In the depicted embodiment, the link 305 allows the user 304 to communicate, using her local communication entity 5, with a peer connected to the remotely located communication entity 350. Each one of the communication entities 1, 350 is connected to the Internet 200, as described above. Such a connection allows the establishment of a standard peer-to-peer (P2P) connection between them. Briefly stated, one or more P2P connections may be extended to support the connection between the portable cellular enhancer 1 of the user 304 and the remotely located portable cellular enhancers 351. Such an embodiment allows the user to share the media content, which is stored on the portable cellular enhancer 1, with a peer who is connected to the Internet 200 via a remote communication entity, as shown at 350, and to access media content that is stored on the remote communication entity of the peer. Such a P2P connection allows the establishment of VoIP sessions between the user 304 and remotely located peers, who are connected to the remotely located portable cellular enhancers 351. The establishment of such VoIP sessions is described above.

Reference is now made, once again, jointly to FIG. 7 and FIG. 8. Optionally, the portable cellular enhancer 1 comprises automatic connection module 454, which is designed to establish a network connection, as shown at 305, in a non-predictable fashion, whenever it identifies an access point in the proximity thereof. Optionally, the Internet connection 305 allows automatic updating of the content that is stored on the local communication entity 5 of the user 304 or automatic downloading of new content according to predefined definitions or uniform resource locators (URLs). In such an embodiment, the server 302 stores and updates dynamic information, such as, calendar, web 2.0, weather, stocks prices, sport events scores, contact list, internet world time (IWT), news, currency rates, and items information. When a connection with a network access point 201 is established, the automatic connection module 454 facilitates automatic updating of predefined content that is stored in the repository or the downloading thereof. Optionally, the user 304 may upload the content that is stored in the repository of the portable cellular enhancer 1 to the local communication entity 5, either in real time or later on. Such an embodiment allows the user 304 to receive up-to-date information without having to establish a connection via the cellular network or to use online services, which are provided by the carrier of the local communication entity 5.

Optionally, the content is stored in mobile widgets. In such an embodiment, the content is stored in a portable chunk of code that is installed and executed within a separate HTML-based web page by a browser that is hosted in the portable cellular enhancer 1. The mobile widget stores the content as a dynamic section of a HTML-based web page, or the like. The content in the mobile widgets is updated periodically or upon request of the portable cellular enhancer 1, for example whenever a WLAN connection is established, as described above, or upon a user request.

Figure 10:
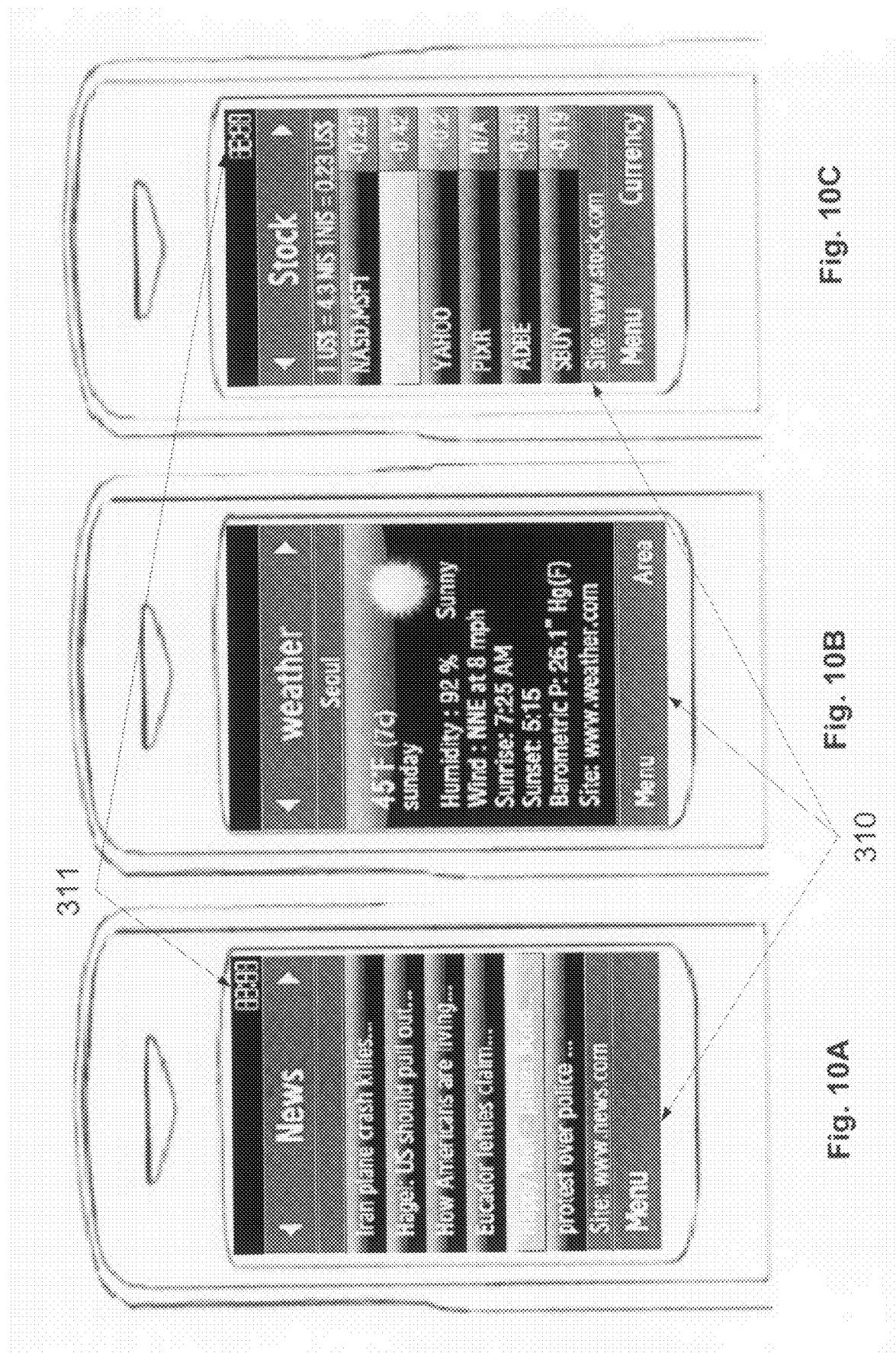
FIGS. 10A-C are schematic illustrations of a mobile phone screen that displays a graphical user interface (GUI) that provides certain dynamic information, according to one embodiment of the present invention.

Optionally, as shown at FIGS. 10A-10C, which are schematic illustrations of screens of a mobile phone, the portable cellular enhancer forwards the uploaded content to the user's mobile phone that presents it on the mobile phone's display. For example, FIG. 10A depicts a mobile phone screen that displays graphical user interface (GUI) that provides news headlines, FIG. 10B depicts a mobile phone screen that displays weather information, and FIG. 10C depicts a mobile phone screen that displays Stock information. As depicted, each screen provides information about the origin of the information 310 and, optionally, the time the presented content has been acquired therefrom 311. Optionally, the portable cellular enhancer 1 installs a software component, such as an applet, on the local communication entity of the user that displays the aforementioned information.

Optionally, the portable cellular enhancer 1 comprises a site synchronization module 455. The site synchronization module 450 allows the user, optionally using a MMI, such as a GUI that is presented on the display of the communication entity, to provide one or more site URLs for synchronization. When a connection with an internet access point, such as the network access point 201, is established, the site synchronization module automatically accesses the predefined URLs and downloads the content that is hosted in the indicated resource. In such a manner, the content of predefined websites or online repositories are stored in the repository of the portable cellular enhancer and available to the user in a local form even when the portable cellular enhancer 1 is offline and no connection with a network access point is established. In such a manner, the portable cellular enhancer 1 provides the local communication devices access to certain websites without establishing a connection via the Internet.

Optionally, the synchronization module 455 automatically uploads information from one or more predefined URLs and updates accordingly the aforementioned virtual site, one or more webpages thereof, or any other media content that is available therethrough. In such an embodiment, the aforementioned virtual site is uploaded to a webspace, such as a social network, a profile or a Blog, which is stored on a network node, such as a server, that is accessible via to the internet. When a communication link is established via the network access point 201, as described above, the portable cellular enhancer 1 automatically accesses the predefined URLs and uploads all or some of the content that is stored in the related resource.

Optionally, the synchronization module 455 allows uploading of information from the local communication entity 5 to a predefined server. For example, the user may upload content that is stored on his communication entity, such as a contact book, a calendar, and a dairy, and the media content that is stored in the repository of the portable cellular enhancer 1. Optionally, when an internet connection is established, as described above, the site synchronization module automatically accesses the predefined server and uploads the information to the predefined server according to a URL address that is assigned thereto.

Optionally, the portable cellular enhancer 1 comprises a geographical location module for providing location-based information to user, optionally via the communication entity. As commonly known, geographical information, Such as country, region, city, latitude, and longitude, of an Internet access point may be deduced from the IP address thereof. For example, lookup databases, such as the list of country codes that is accessible here: http://www.iana.org/domain-names.htm and incorporated herein by reference may be used, together with known reverse domain name services (DNS) methods, to induce the geographic location of the access point. Optionally, when a connection with the Internet access point is established, the geographical location module automatically identify the IP address of the access point, accesses a designated map repository and downloads the maps of which are related to the geographical location of the network access point. Additional location based information and services, such as friend spotting, tourist services, directions to sites, and information on sites, information on restaurants, information on hotels, and information on special events, etc. may be downloaded from a designated server.

Optionally, the link 305 allows the user 304 to browse the Internet 200. For example, the user 304 may be directly connected or allowed to access to promoted content sites, games, or any other content that has been predefined by the manufacturer of the portable cellular enhancer 1 or configured before the aforementioned communication link has been established.

Optionally, if the communication link between the portable cellular enhancer 1 and the network access point 201 is disconnected, the portable cellular enhancer 1 automatically searches for a new access point for reestablishing a WLAN connection.

Optionally, the portable cellular enhancer 1 hosts a security module 457. The security module 457 provides the user with the ability to manage and configure the security level of the communication with the local communication entities 5, the local computing unit 202, and the access point 201, which are established by the portable cellular enhancer 1. The security module is designed to be configured from the local communication entity 5 of the user 304 using an adjusted MMI, as described above.

Optionally, the security module runs a virus filter to catch viruses before they get to the portable cellular enhancer 1 or a virus scan that scans the content of the portable cellular enhancer 1 every predefined period. Optionally, the security module runs a firewall that improves the user safety by implementing password mechanisms and intelligent network management. The implementations of such a firewall, a virus scan, and a virus filter are well known and hence are not described in further detail.

Figure 11:
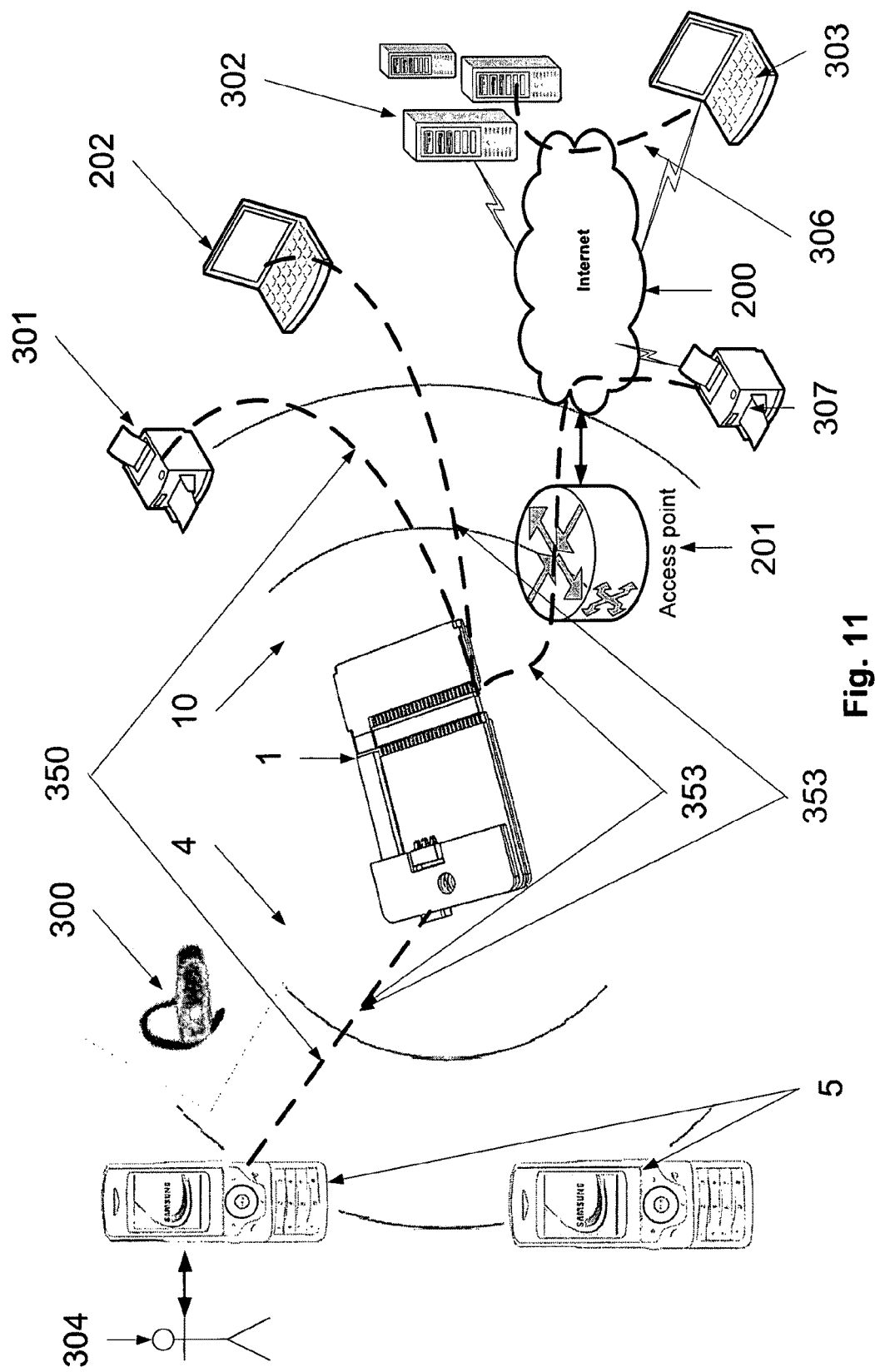
FIG. 11 is a schematic illustration, based on FIG. 8, that depicts two communication links that connects between a communication entity of a user and a printer or a local computing unit, according to embodiments of the present invention.

Reference is now made to FIG. 11, which is based on FIG. 8, depicts a first communication link 350 that connects between the user's local communication entity 5 and the printer 301, a second communication link 353 that connects between the user's local communication entity 5 and the local computing unit 202, and a third communication link 353 that connects between the user's local communication entity 5 and a remote printer 307, according to embodiments of the present invention.

Optionally, the WLAN interface of the portable cellular enhancer 1 establishes communication links 353, 354 and 355, as described above. Optionally, the portable cellular enhancer 1 comprises a print spooler module that sequences print jobs by temporarily storing them in a buffer and sending them to one or more printers 301, 307, when the printers are able to process them. Optionally, the print spooler module converts each print job to an independent format and only then sends it to the printers.

In such an embodiment, the portable cellular enhancer 1 allows the user 304 to print the media content that is stored on the portable cellular enhancer 1 or in media content received from the local communication entity 5. Optionally, the WLAN interface of the portable cellular enhancer 1 establishes a wireless connection 351 with one or more local computing unit 202, such as personal computers or laptops.

Figure 12:
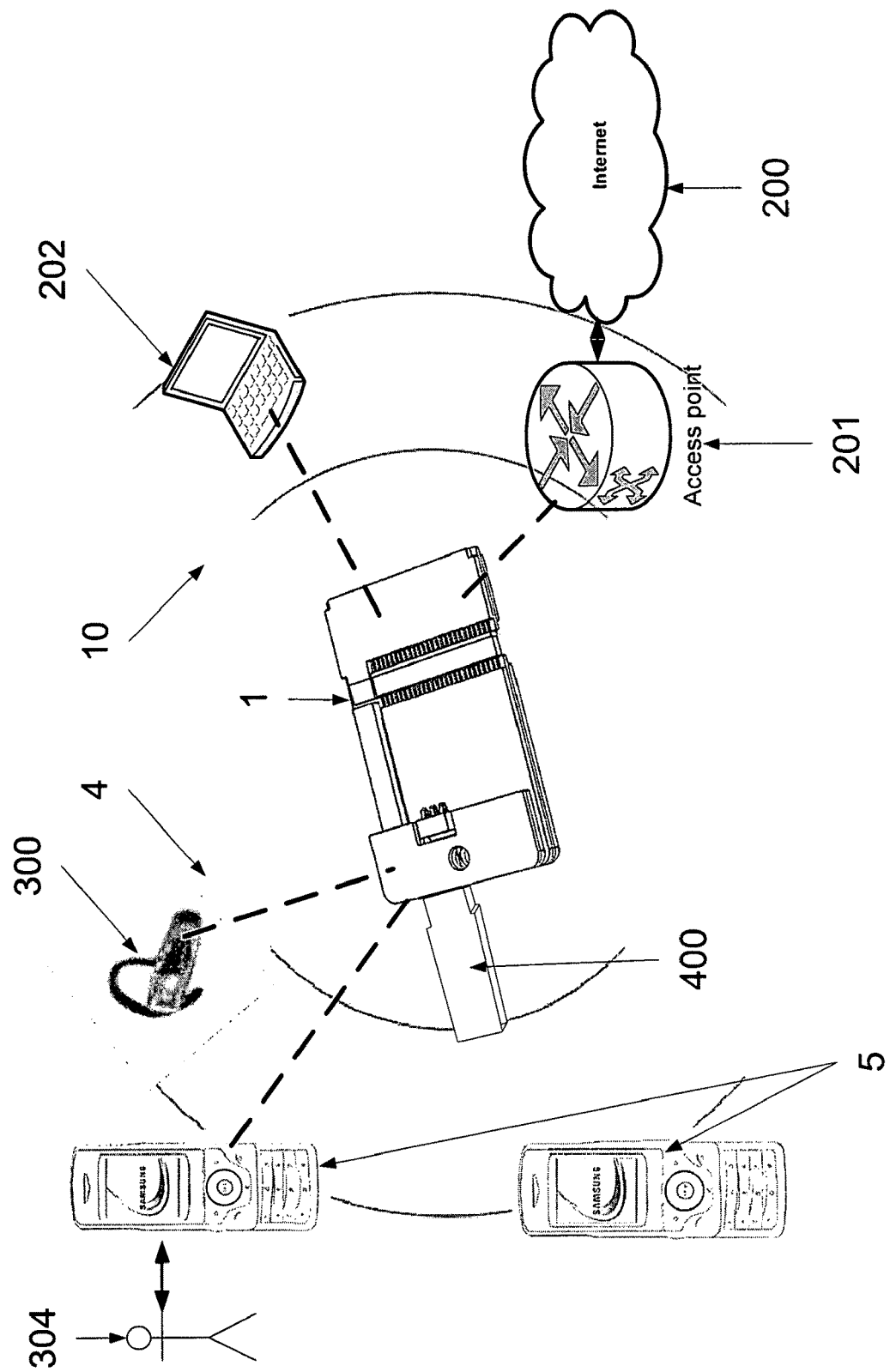
FIG. 12 is a schematic illustration of the portable cellular enhancer of FIG. 6, which is connected to a memory drive and entities it may communicate with, according to one embodiment of the present invention.

Reference is now made to FIG. 12, which is a schematic illustration of the portable cellular enhancer 1, which is connected to a memory drive 400, such as a Disk-On-Key™, and entities it may communicate with, according to one embodiment of the present invention. The portable cellular enhancer 1, the internet 200, the local communication entities 5, the remotely located computing unit 303, the user 304, and the hotspot 201 are as in FIG. 8. FIG. 12 further depicts a portable storage device 400 that is connected to the portable cellular enhancer 1 and links that connects between the portable cellular enhancer 1 and the local communication entities 5, the wireless earphone 300, the local computing unit 202, and the access point 201.

As described above, the portable cellular enhancer 1 comprises a USB interface or a memory card reader that allows the portable cellular enhancer 1 to access the content of a portable storage device 400, such as a USB drive or a memory card, which is connected thereto. As shown at 401 and described above, the portable cellular enhancer 1 establishes a WPAN 4 with one or more local communication entities 5 or earphone 300. As shown at 402 and described above, the portable cellular enhancer 1 establishes a WLAN connection with the local computing unit 202 or the access point 201, as described above. Such a WLAN connection allows the local communication entities 5 and the local computing unit 202 to access, to upload, and to download wirelessly the media content that is stored in the portable storage device 400. In such a manner, the user may use the portable cellular enhancer 1 to turn the media content that is stored in the portable storage device 400 to wirelessly available media content that is accessed by at least one of the local communication entities 5, the local computing unit 202, and a remote computing unit that is connected to the access point 201. Optionally, the content, which is stored in the portable storage device 400, is exported as a virtual shared drive for all peers who are connected to the portable cellular enhancer 1.

Figure 13:
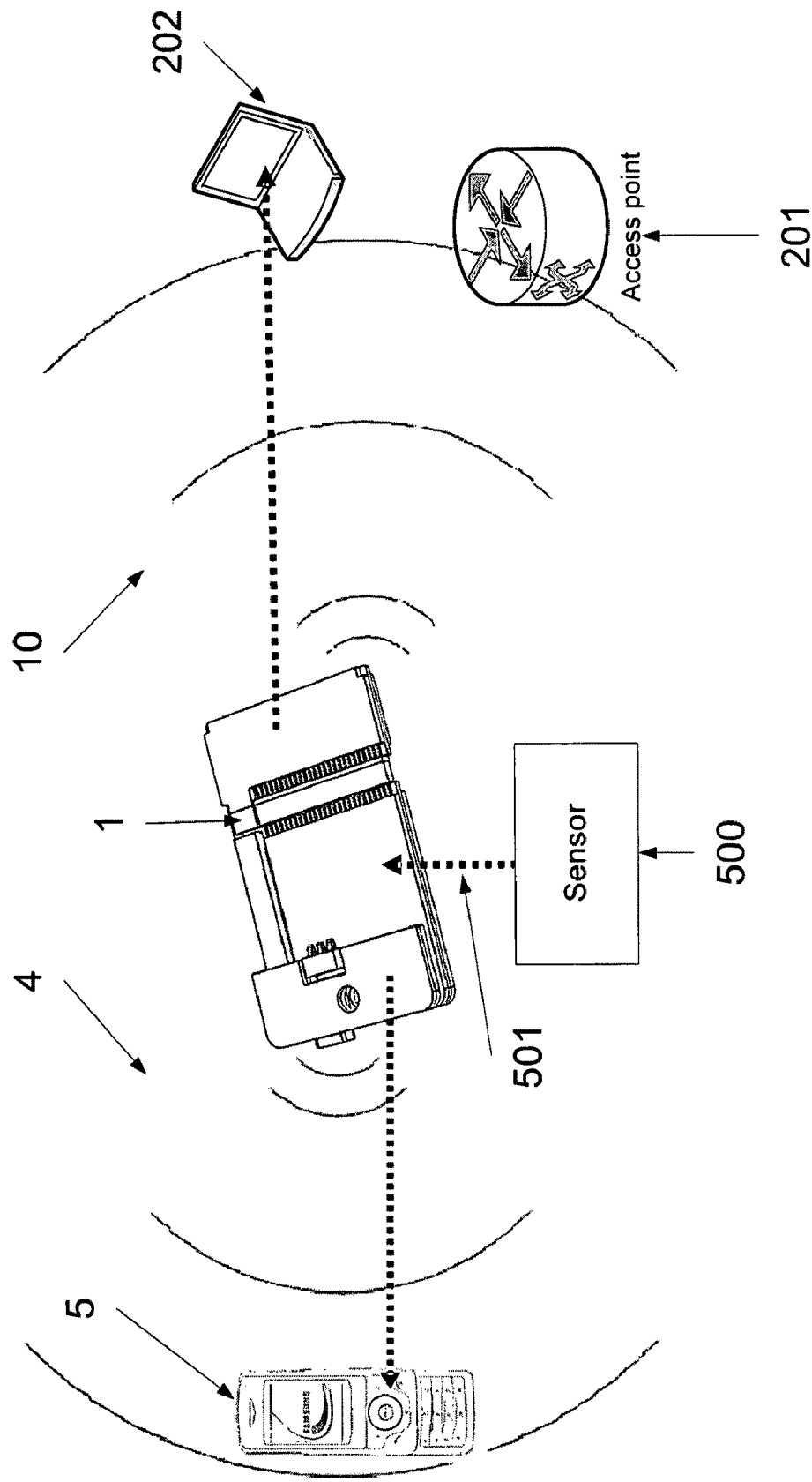
FIG. 13 is a schematic illustration a portable cellular enhancer with a sensor and the of communication thereof with one or more entities, according to another embodiment of the present invention.

Reference is now made to FIG. 13, which is a schematic illustration of the communications, which may be established via the portable cellular enhancer 1, according to one embodiment of the present invention. FIG. 13 further depicts a sensor 500 that is associated with the portable cellular enhancer 1. The sensor 500 may either be integrated into the portable cellular enhancer 1 or communicate with the WPAN interface or the WLAN interface via a designated link, as shown at 501.

Optionally, the portable cellular enhancer 1 comprises an image sensor, such as a complementary metal oxide semiconductor (CMOS) sensor or a charged coupled portable autonomous device (CCD) sensor. The image sensor captures images, optionally stores them in the repository of the portable cellular enhancer 1, and transmits them to one or more of the local communication entities 5, which are connected thereto, or to the local computing unit 202. Optionally, the images are forwarded to a group of peers who are defined by the aforementioned peer authorization module. In such a manner, the user may share the images in real time with a group of selected friends or acquaintances.

Optionally, the portable cellular enhancer 1 comprises a motion sensor, such as a passive pyroelectric sensor, a passive infrared sensor, an accelerometer, and a piezoelectric sensor. Optionally, the motion sensor is the aforementioned image sensor. Optionally, the aforementioned image sensor is used as a motion sensor. The motion sensor, which may be understood as a displacement sensor, captures the movements of the portable cellular enhancer and translates them to movement vectors. The movement vectors are transmitted to the local communication entity 5 or to the local computing unit 202, optionally as directional instructions to one or more of the applications thereof. The directional instructions may be correlated to the displacement of a cursor image on a display screen of the local communication entity 5 or the local computing unit 202.

Optionally, the calculated motion vector reflects the shifting of the portable cellular enhancer 1 in a two dimensional plane which is parallel to the image sensor. Optionally, the motion vector is a spatial motion vector that reflects the shifting of the portable cellular enhancer 1 in a three dimensional space. In order to generate a spatial motion vector, at least two image sensors, which are coupled to the portable cellular enhancer 1 in an unparallel manner, are used. Each one of the image sensors is generates, as described above, a linear motion vector that reflects the shifting of the portable autonomous device in a two dimensional plane. Since the linear motion vectors are positioned in different, nonparallel planes, the generated linear motion vectors differ one from another and respectively reflect the motion of the device in different, nonparallel planes. Such an embodiment allows the user to produce 3D images on the screen of the communication entity, to play 3D games, etc. A detailed description of the displacement detection and the motion vector generation is provided in U.S. Patent Application No. 2007/0041616, published on Feb. 22, 2007 and incorporated herein by reference.

Optionally, the motion sensor is connected to the portable cellular enhancer 1 as a local communication entity 5 or a unit of a certain local communication entity 5. In such an embodiment, the aforementioned movement vectors, which are generated by the motion sensor, are forwarded via the portable cellular enhancer 1 to the communication entity, of the user.

Figure 14:
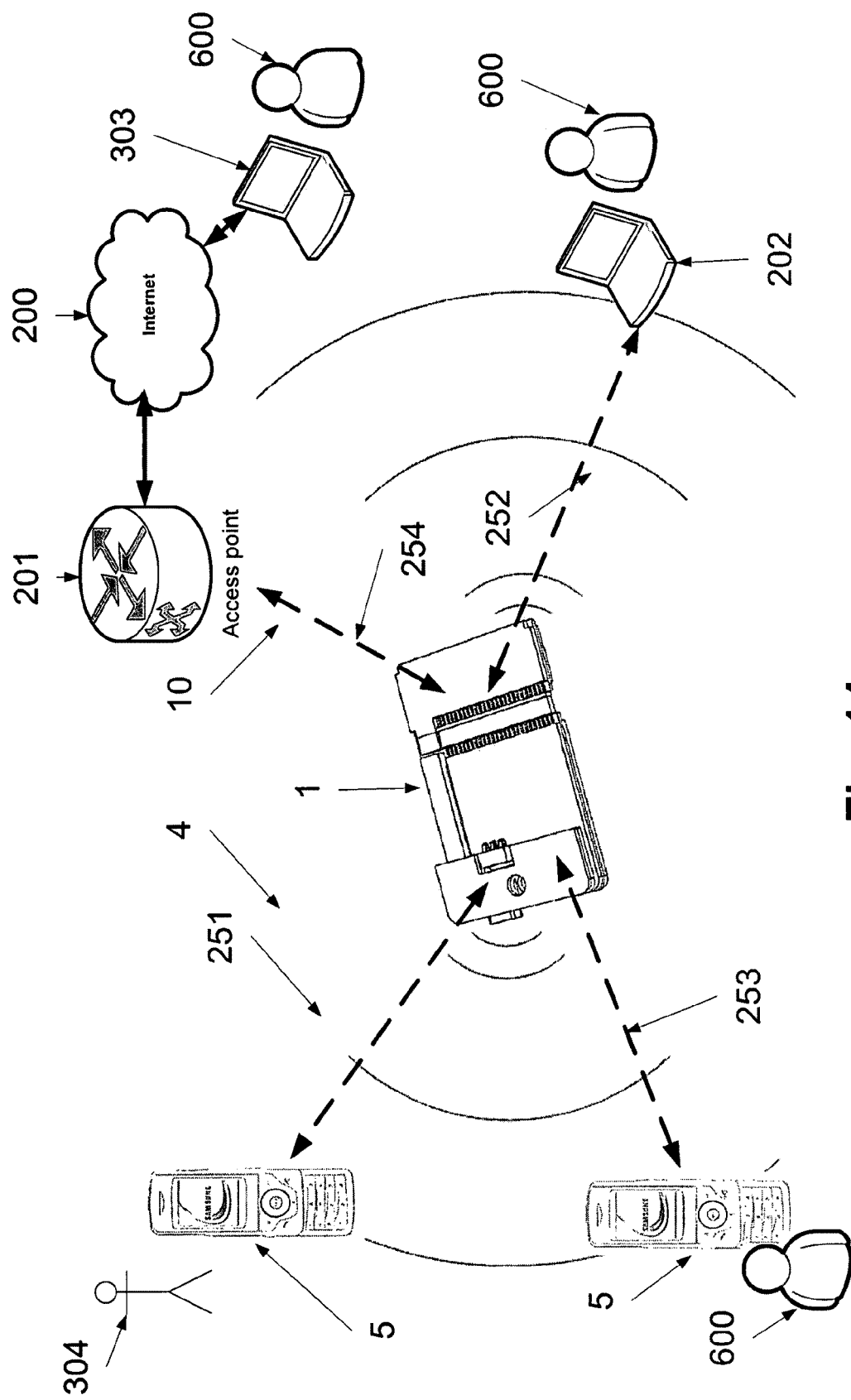
FIG. 14 is a schematic illustration of the communication between the portable cellular enhancer and the one or more entities, according to one embodiment of the present invention.

Reference is now made to FIG. 7 and FIG. 14, which is a schematic illustration of communication links between the portable cellular enhancer 1 and remote and local entities, according to an embodiment of the present invention. As described above, the portable cellular enhancer 1 establishes a communication link with at least one of the communication entities 5, the local computing unit 202, and remotely located computing unit 303, respectively as shown at 251-252, 253, and 254. Optionally, the portable cellular enhancer 1 comprises an interacting module 458 that allows the user 304 to interact with one or more peers.

Optionally, the interacting module 458 comprises as a gaming sub-module 459 that hosts and manages a multiplayer game. In such an embodiment, the portable cellular enhancer 1 functions as a game server that receives data from the linked entities 5, 202 and 303, and sends data thereto. Optionally, in use, an interaction, made by the user 304 or one of the peers

505, is coded by the related linked device and transmitted to the gaming sub-module 459 of the portable cellular enhancer 1. The gaming sub-module 459 sends data to all the linked devices 5, 202 and 303, thereby updates them regarding the interaction. Optionally, the gaming sub-module 459 runs a game environment that optionally comprises non-static, scenes, optionally having a detailed 3D background, which may be viewable from different vantage points. Optionally, the game environment is compellable to Java 2 Platform, micro edition (J2me) and Symbian supported phones.

For example, the gaming sub-module 459 runs a game having a shared graphical world, such as a shared arena or a shared battlefield. Each one of the linked devices 5, 202 and 303, which are connected to the game, has access to the shared graphical world and controls a plaything such as a pawn, a group of pawns, a figure, a group of figures, a machine, a group of machines, etc. Each participating peer uses her linked device for inserting instructions to her plaything. Optionally, the instructions are forwarded to as a set of movement vectors and discrete values. The instructions are forwarded to the portable cellular enhancer 1 that updates the shared graphical world accordingly. Preferably, all graphical management and manipulation is performed by the portable cellular enhancer 1. During the course of the game, the actions and reactions of the playthings of the participating peers and changes to the shared graphical world are forwarded to all the participating linked devices 5, 202. Optionally, actions and reactions of virtual playthings, which are hosted at the shared graphical world, are also forwarded to the linked devices 5, 202 during the course of the game. It should be noted that as the manipulation and management of the graphics of the game, the shared graphical world, the virtual playthings, and the actions and reactions of the virtual playthings are processed by the portable cellular enhancer 1, the linked devices 5, 202 are free to use their computational resources for other proposes, such as managing cellular calls etc. Moreover, as the linked devices 5, 202 have only a limited involvement in the processing of the game, as described above, communication entities with limited capabilities may also serve peers that participate in such a game.

As described above, the portable cellular enhancer 1 comprises a wired or a wireless video output. Optionally, the portable cellular enhancer 1 functions as a gaming console. In such an embodiment, the gaming sub-module 459 renders images of the game environment via the video output to a display screen, such as a DTV. In use, the gaming sub-module 459 manages a game, optionally a multiplayer game, and renders the dynamic game environment on the screen. In such a manner, the user 10 and optionally peers that participate in the game can watch the game environment on the screen while using their communication entity 5 as wireless controllers.

Optionally, the communication entity 5 is defined as device for converting movement and movement patterns to control signals, for example as disclosed in U.S Patent Application Publication Numbers 2007/0041058 and 2007/0041616 published on Feb. 22, 2007, and in U.S Patent Application Publication Number 2007/0067745 published on Mar. 22, 2007, which are incorporated herein by reference. In such an embodiment, the movements and the movement patterns of each communication entity 5 are forwarded to the portable cellular enhancer 1 and allow the user of the related communication entity 5 to control one or more virtual objects which are managed in the game.

Optionally, the interacting module 458 of the portable cellular enhancer 1 comprises a chatting sub-module 460 that allows multiple peers to participate simultaneously in a real time communication session by joining a chat room accessed through or managed by the local communication entity 5, the local computing unit 202, or the remotely located computing unit 303. In such an embodiment, peers with local communication entities 5 without chatting modules or abilities may participate in a chat using the portable cellular enhancer 1. The chat is managed and processed by the portable cellular enhancer 1.

A peer logs into one of the chat rooms, which are provided by the chatting sub-module 460, via one of the communication links 251, 252, 253, and 254, as described above. Inside each chat room, there is optionally a list of peers who are currently connected to chatting sub-module 460 of the portable cellular enhancer 1. Optionally, the chatting sub-module 460 allows peers to communicate with one another using audio and video transmissions that provide an audiovisual form of a chat room. Optionally, peer may be added to one or more of chat rooms automatically when they are detected by the portable cellular enhancer 1.

Optionally, the portable cellular enhancer 1 comprises a file sharing module 461 that allows multiple peers to share files simultaneously, in a real time communication sessions, as described above. For example, the user 304 may upload an audio or video file to the portable cellular enhancer 1 that is shared with peers 600, via on or more of the communication links 251, 252, 253, and 254.

Optionally, the file sharing module 461 hosts a file-sharing client, of a file-sharing network, that is accessible to the user 10 and optionally to authorized peers, for example as described above. The file-sharing client allows the user 10 and the peers to designate files for downloading and allow the user to share the media content, which is stored in the repository, with one or more peers in the proximity thereof and with one or more peers, which are connected to the Internet 203, optionally as described above. Optionally, the file-sharing client allows the peers to share files, which are stored in the repository of their communication entities. The WPAN, which is established with the communication entities, is used for uploading the shared files, or segments thereof, either to the portable cellular enhancer 1 or via the portable cellular enhancer 1 to a remote entity that is connected to the file-sharing network.

Optionally, the file-sharing client manages a list of shared files that comprises pointers and/or addresses of files, which are hosted in the repository 2 and in the memory of the communication entities 5 and may allow all the communication entities 5 to download files therewith.

Optionally, the portable cellular enhancer 1 comprises a streaming module that allows streaming media content, such as audio and video content, over the WPAN 4 to communication entities 5 and over the WLAN 10 to the local computing unit 202 or the access point 201. Optionally, the streaming module deploys media content streams by compressing media content into a single media file for delivery over a specific bandwidth, such as a 28.8 kilobits per second (Kbps), that is adapted to the network bandwidth of the WPAN 4, the WLAN 10, or both. Then, the media file is stored in the repository. Next, the streaming module allows at least one of the local communication entities 5, the local computing unit 202, or the remotely located computing unit 303, to launch a client-side player and to download the media file. The streaming client starts playing the audio or video while it is downloading, after only a few seconds wait for buffering, the process of collecting the first part of a media file before playing. Optionally, the streaming module uses a hypertext transport protocol (HTTP) for communication between the portable cellular enhancer 1 and the aforementioned entities 5, 201, and 303. The HTTP operates on top of a transmission control protocol IP (TCP/IP) that handles all the data transfers and maximizes the data transfer rate while ensuring overall stability and high throughput of the streaming. Optionally, a slow start algorithm is used, wherein the streaming module first sends data at a low data rate, and then gradually increases the rate until the destination reports packet loss. Optionally, the streaming module uses specialized protocols such as the user datagram protocol (UDP).

Optionally, the portable cellular enhancer 1 comprises an RF modulator that is designed to take the media file and outputs a radio frequency-modulated signal based thereon. The modulator is programmed to broadcast the signals on a certain frequency that is broadcasted to one or more devices, which are tuned on the certain frequency, such as TVs, radio receivers, communication entities with RF receivers, etc. Optionally, the RF modulator outputs on FM radio frequencies that are optionally intercepted by home and car audio and video systems. Such an embodiment allows the broadcasting of the media content that is stored on the repository to a number of peers who are not connected to the WPAN 4 or the WLAN 10.

In such an embodiment, the portable cellular enhancer 1 may be used for allowing a number of peers to listen or watch common media content simultaneously. For example, the user 304 may upload an audio file, such as a sound track, to the portable cellular enhancer 1 and the streaming module may stream the audio file simultaneously to the user 304 and to a number of peers.

Reference is now made, once again, to FIG. 4B. Optionally, a set of buttons 21, which is used as a MMI, is mounted on the housing 20 of the portable cellular enhancer. Such a set allows the user to configure the mode of the portable cellular enhancer, to adjust the volume, etc. It should be noted that the mobile phone of the user may be used as the MMI of the portable cellular enhancer 1, as described above.

Optionally, a number of indicators, such as light emitting diodes (LEDs), are integrated into the housing 20, as shown at 21, 22, 23, and 24. Optionally, one of the indicators is design to indicate the operational mode the portable cellular enhancer 1.

Optionally, the indicator, which is shown at 22, is design to indicate the state of the WPAN interface. The indicator changes its color or blinking rate to indicate whether one or more communication entities of peers communicate with the portable cellular enhancer, as described above. Optionally, the indicator, which is shown at 25, is designed to indicate the state of the WLAN interface. The indicator changes its color to indicate whether a wireless network has been found or not and whether the portable cellular enhancer is connected thereto, as described above. Optionally, the indicator, which is shown at 24, is designed to indicate the type of the communication traffic that is supported by the portable cellular enhancer. Optionally, the indicator, which is shown at 21, is design to indicate the state of the microcontroller of the portable cellular enhancer.

Figure 15:
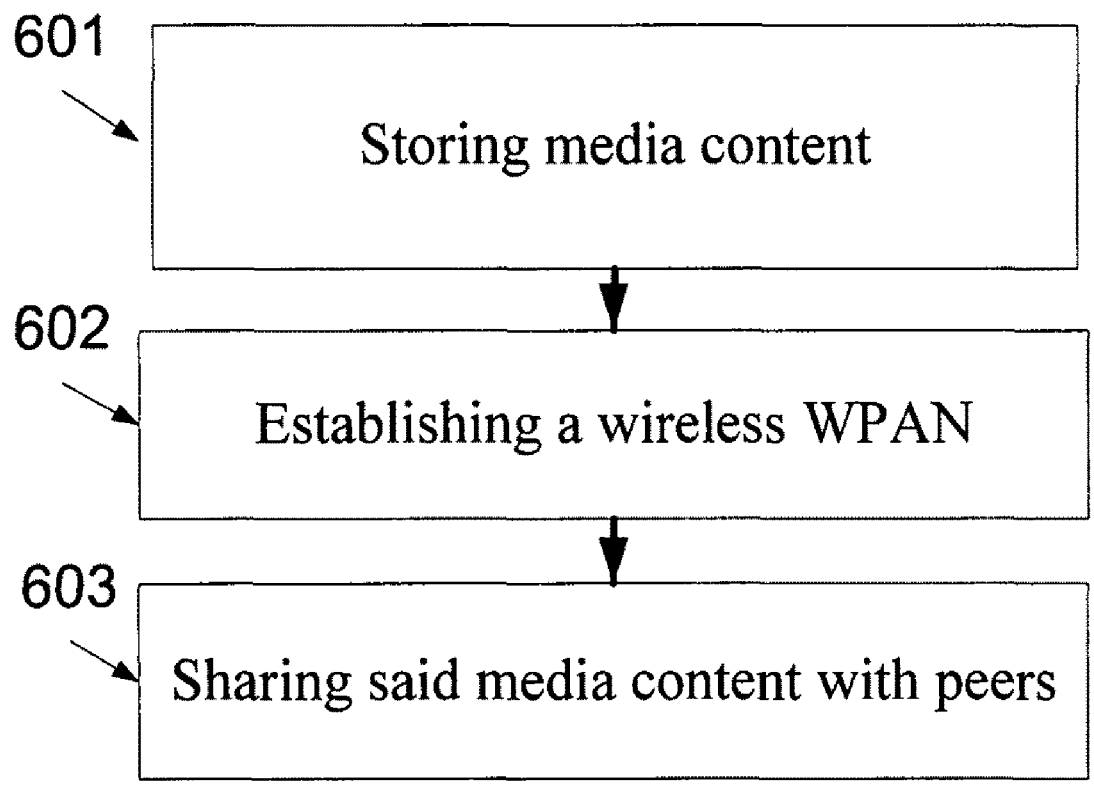
FIG. 15 is a flowchart of a method for sharing media content defined by a user with one or more peers in the proximity thereof, according to one embodiment of the present invention.

Reference is now made to FIG. 15, which is a flowchart of a method for sharing media content defined by a user with one or more peers in the proximity thereof, according to one embodiment of the present invention. During the first step, at shown at 601, media content is defined and stored by the user. The user uses a communication entity, such as a mobile phone, to input the media content to a repository in a portable cellular enhancer, as described above. Then, as shown at 602, at least one connection is established with communication entity of a peer in a predefined proximity. Optionally, as described above, a WPAN interface is used for discovering mobile phones in the proximity of the portable cellular enhancer. Optionally, after the mobile phones have been discovered, the type and name of each one of them is identified. A WPAN, or any other communication link, is established with the mobile phones of the peers. During the following step, as shown at 603, the media content, which is optionally stored in the repository of the portable cellular enhancer, is shared with one or more peers, optionally by facilitating each peer in the proximity of the portable cellular enhancer to use his mobile phone to access the media content the related communication link.

It is expected that during the life of this patent many relevant devices and systems will be developed and the scope of the terms herein, particularly of the terms a module, and a microcontroller are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An apparatus for forwarding media content to at least one of a plurality of communication entities in proximity thereto, said apparatus comprising:
    an acquisition unit for acquiring media content; and
    a wireless interface configured for establishing first and second wireless personal area network (WPAN) connections with at least one of the plurality of communication entities, said first WPAN connection being configured for forwarding said media content to at least one of the plurality of communication entities, said second WPAN connection being configured for receiving operational instructions from at least one of the plurality of communication entities.

2. The apparatus of claim 1, further comprising a repository for storing said media content, wherein said acquisition unit receives said media content from said repository.

3. The apparatus of claim 1, wherein said wireless interface is configured for establishing a plurality of first WPAN connections with the plurality of communication entities and forwarding said media content to at least one of the plurality of communication entities respectively via at least one of said plurality of first WPAN connections.

4. The apparatus of claim 1, further comprising a processing unit for processing said media content, said first WPAN connection being configured for forwarding said processed media content to at least one of the plurality of communication entities.

5. The apparatus of claim 4, wherein said processing comprises rendering said media content.

6. The apparatus of claim 1, further comprising a WLAN interface configured for establishing a communication link with a first access point of a packet-switching network having at least one node.

7. The apparatus of claim 6, wherein said wireless interface is configured for periodically polling said access point.

8. The apparatus of claim 6, further comprising a repository for storing said media content, said acquisition unit receives said media content from said repository.

9. The apparatus of claim 8, wherein said node stores said media content, said communication link being used for uploading said media content from said repository to said node.

10. The apparatus of claim 9, wherein said node stores said media content, said communication link being used for downloading said media content from said node to said repository.

11. The apparatus of claim 10, wherein said downloading is performed automatically.

12. The apparatus of claim 6, wherein said apparatus is configured for forwarding a media stream from said node to at least one of the plurality of communication entities.

13. The apparatus of claim 6, wherein said node is a second access point, said second access point being connected to an additional apparatus.

14. The apparatus of claim 6, wherein said acquisition unit is configured for acquiring said media content from said at least one node via said communication link.

15. The apparatus of claim 6, wherein said wireless interface is configured for receiving additional media content via one of said WPAN connections.

16. The apparatus of claim 15, wherein wireless interface is configured for forwarding said additional media content to said at least one node via said communication link.

17. The apparatus of claim 15, further comprising a voice over internet protocol (VoIP) adaptor configured for converting said media content to an audio signal and said additional media content to VoIP signal.

18. The apparatus of claim 15, further comprising a print spooler for spooling said additional media content.

19. The apparatus of claim 6, further comprising a geographical information module configured for identifying a geographic location of said access point according to the IP address thereof.

20. The apparatus of claim 19, wherein said geographical information module is configured for obtaining geographic information via said communication link according to said geographic location.

21. The apparatus of claim 6, further comprising a gaming module, said gaming module being configured for managing a multiplayer game having at least two participants using respective at least two of the plurality of communication entities.

22. The apparatus of claim 6, further comprising a chatting module, said chatting module being configured for allowing at least two users to participate in a chat using respective at least two of the plurality of communication entities.

23. The apparatus of claim 6, further comprising a file sharing module, said file sharing module being configured for allowing at least two users to receive said media content using respective at least two of the plurality of communication entities.

24. The apparatus of claim 1, further comprising a motion sensor for detecting a movement vector of said apparatus.

25. The apparatus of claim 24, further comprising a movement detection module for converting said movement vector to directional instructions, said directional instructions being forwarded to at least one of the plurality of communication entities.

26. The apparatus of claim 25, wherein said directional instructions being used by at least one application hosted on said at least one of the plurality of communication entities.

27. The apparatus of claim 25, wherein said directional instructions includes a 3D motion vector.

28. The apparatus of claim 1, wherein said forwarding comprises streaming said media content.

29. The apparatus of claim 1, wherein said wireless interface is configured for instructions and managing said first and second wireless personal area network (WPAN) connections according to said instructions.

30. The apparatus of claim 1, wherein said operational instructions comprises a member of the following group: storing said media content, updating said media content, managing said media content, deleting said media content, backing up said media content, and creating said media content.

31. The apparatus of claim 1, wherein said apparatus does not have a screen display.

32. The apparatus of claim 1, wherein said apparatus is not a communication entity.

33. The apparatus of claim 1, wherein said apparatus is a handheld device.

34. An apparatus for supporting an interaction between a user and a peer having a first communication entity, said apparatus comprising:
a housing;
a repository for storing personal profile defined by the user; and
a wireless interface configured for establishing a first direct bi-directional wireless personal area network (WPAN) connection with a first communication entity when said first communication entity comes in proximity to said housing;
wherein said first direct bi-directional WPAN connection a peer having the first communication entity to share said personal profile stored in said repository via said first direct bi-directional WPAN connection.

35. The apparatus of claim 34, wherein said personal profile comprises a member of the following group: a social network profile page, a personal webpage, personal information about said user, an image, a Blog, a webspace, a list of contacts, an audio sequence, a video sequence, an audio file, a video file, personal written information, a personal multimedia content, and a link to a website.

36. The apparatus of claim 34, wherein said wireless interface is a short-range radio interface.

37. The apparatus of claim 34, wherein said apparatus is a communication entity.

38. The apparatus of claim 34, further comprising an authentication module configured for identifying access privileges of said first communication entity, said access being determined according to said respective access privileges.

39. The apparatus of claim 34, wherein said wireless interface is configured for establishing WPAN connections with a plurality of communication entities in a predefined proximity to the apparatus, each said communication entity being associated with a different peer.

40. The apparatus of claim 39, further comprising a gaming module, said gaming module allows at least two of said peers to participate in a multiplayer game using respective said communication entities.

41. The apparatus of claim 39, further comprising a chatting module, said chatting module allows at least two of said peers to participate simultaneously in a common communication session using respective said communication entities.

42. The apparatus of claim 39, further comprising a file sharing module 461, said file sharing module 461 allows at least two of said peers to access said personal profile simultaneously using respective said communication entities.

43. The apparatus of claim 42, further comprising a streaming module, said file sharing module 461 streams said personal profile to each said communication entity.

44. The apparatus of claim 34, further comprising a WLAN interface configured for establishing a communication link with a computing unit having a WLAN interface.

45. The apparatus of claim 44, further comprising a WLAN interface configured for establishing a communication link with a first access point of a network having at least one node.

46. The apparatus of claim 45, wherein said apparatus allows said user to access said at least one node using a second communication entity connected to said wireless interface via a second WPAN connection.

47. The apparatus of claim 46, said user uses said second communication entity for performing one of the following: storing said personal profile, updating said personal profile, managing said personal profile, deleting said personal profile, backing up said personal profile, and creating said personal profile.

48. The apparatus of claim 46, further comprising a voice over internet protocol (VoIP) adapter configured for facilitating said first and second communication entities to establish a VoIP session.

49. The apparatus of claim 45, wherein said apparatus allows said peer to access said at least one node using said communication entity, via said WPAN and said communication link.

50. The apparatus of claim 34, wherein said wireless interface being configured for establishing a second WPAN connection for receiving operational instructions for the apparatus.

51. The apparatus of claim 34, wherein said repository is a removable repository.

52. The apparatus of claim 51, further comprises a memory card reader for reading said personal profile from said removable repository.

53. The apparatus of claim 51, wherein said removable repository being stored on a flash drive, further comprises a flash drive interface for reading said removable repository from said flash drive.

54. The apparatus of claim 34, wherein said apparatus does not have a screen display.

55. A method for sharing user-defined information with a peer, comprising:
 establishing a first wireless personal area network (WPAN) connection with a first communication entity of a user;
 storing media content defined by said first communication entity in a portable cellular enhancer; and
 when a second communication entity of a peer is within a defined proximity of said first communication entity, establishing a second WPAN connection with said portable enhancer for allowing said second communication entity to access said first media content.

56. A method for sharing user-defined information with a peer, comprising:
 establishing a first wireless personal area network (WPAN) connection with a first communication entity of a user;
 storing media content defined by said first communication entity of the user in a portable cellular enhancer;
 when a second communication entity of a peer is within predefined proximity of said first communication entity of the user then establish a second WPAN connection between said second communication entity of the peer with said cellular enhancer which results in supporting interaction between said first communication entity of said user via said first WPAN connection and said second WPAN connection wherein supporting interaction comprises accessing said media content; and
 performing at least one of the following: updating said media content, managing said media content, deleting said media content, backing up said media content, and creating said media content.

57. A method for sharing user-defined information with a peer, said method comprising the following steps:
 establishing a first wireless personal area network (WPAN) connection with a first communication entity of a user;
 via an access point and said first communication entity sequentially polling said access point;
 when a second communication entity of a peer is within predefined proximity of said first communication entity of the user then establish a second WPAN connection between said second communication entity of the peer with a cellular enhancer which results
 supporting interaction between said first communication entity of said user, via said first WPAN connection and the peer via said second WPAN connection; and
 establish a communication link with a first access point of a network having at least one node.

* * * * *